(12) United States Patent
Chambers et al.

(10) Patent No.: US 6,469,469 B1
(45) Date of Patent: Oct. 22, 2002

(54) VARIABLE OUTPUT INDUCTION MOTOR DRIVE SYSTEM

(75) Inventors: Derek Chambers, Sarasota, FL (US); Richard H. Baker, Bedford, MA (US); S. Merrill Skeist, Syosset, NY (US)

(73) Assignee: Spellman High Voltage Electronics Corp., Hauppauge, NY (US)

( * ) Notice: Subject to any disclaimer, the term of this patent is extended or adjusted under 35 U.S.C. 154(b) by 0 days.

(21) Appl. No.: 09/654,498

(22) Filed: Sep. 1, 2000

(51) Int. Cl.[7] .............................................. H02P 5/41
(52) U.S. Cl. ...................... 318/801; 318/807; 318/808; 318/810
(58) Field of Search .................. 318/727, 767, 318/798–803, 807–812

(56) References Cited

U.S. PATENT DOCUMENTS

| | | | | |
|---|---|---|---|---|
| 4,361,794 A | * | 11/1982 | Kawada et al. | 318/800 |
| 4,471,285 A | * | 9/1984 | Kawada et al. | 318/808 |
| 4,558,269 A | * | 12/1985 | Ishida et al. | 318/811 |
| 4,559,485 A | * | 12/1985 | Whited | 318/802 |
| 4,752,725 A | * | 6/1988 | Ominato | 318/807 |
| 4,935,684 A | * | 6/1990 | Watanabe | 318/729 |
| 5,345,160 A | * | 9/1994 | Corniere | 318/811 |

* cited by examiner

*Primary Examiner*—Bentsu Ro
(74) *Attorney, Agent, or Firm*—Arthur W. Fisher, III

(57) ABSTRACT

A variable output induction motor drive system for use with a polyphase variable output alternating current motor including a rotor and stator to drive an operating load such as an automotive vehicle, the variable output induction motor drive system comprises a sine wave current generator operatively coupled to a direct current power source to receive direct current therefrom and to generate a variable sine wave current and operatively coupled to the polyphase variable output alternating current motor to selectively feed the variable sine wave current thereto and a sine wave current control coupled between the sine wave power current generator and the polyphase variable output alternating current motor to monitor the operating parameters of the polyphase variable output alternating current motor and to control the amplitude and frequency of the variable sine wave current fed from the sine wave current generator to the polyphase variable output alternating current motor to control the output torque and speed thereof.

59 Claims, 21 Drawing Sheets

Sinusoidal PWM

Notes:
KTO means 'Key Turn on' (i.e. at Start-up)

At KTO: Reset Counter 401
Set Register 410 to count 21 (typical)
Set Up/Down Counter 420 to 6Hz (typical)
Set Register 402 to zero

VARIABLE OUTPUT INDUCTION MOTOR DRIVE SYSTEM

BACKGROUND OF THE INVENTION

1. Field of the Invention

A variable output induction motor drive system for use with a polyphase variable output alternating current motor.

2. Description of the Prior Art

Induction motors are the most widely used source of electric drive power in industrial and domestic applications. Their popularity is due to the basic simplicity and ruggedness of the basic concept, and relatively low cost manufacture. Induction motors do not use brushes or slip rings, and have the fewest windings and the least insulation requirements compared with other types of DC or AC motors.

However, the induction motor has one major limitation in applications requiring variable speed operation because the number of magnetic poles in the motor and the frequency of the power source determine the speed of rotation. In the United States where the power line frequency is 60 Hz, a two-pole induction motor therefore runs at a nominal 3600 rpm. Unfortunately, such a constant speed motor is not well suited in many industrial processes where variable throughput is required. Until variable speed drives became available for induction motors, one solution was to apply mechanical throttling at the output with the motor running at normal speed. This resulted in an unacceptably wasteful use of power to control throughput. About 25 years ago, the development of low cost semiconductor power devices opened up the possibility of designing cost effective and efficient variable frequency power sources capable of driving variable speed drive systems for three phase induction motors.

However, controlling the speed of an induction motor is more difficult than controlling the speed of a DC motor in which the torque is basically proportional to the product of the flux per pole and the armature current.

In a DC motor, separate connections to the field and the armature windings are generally available so that the field winding may be connected either in series or in parallel with the armature winding, or separately excited. Various well-known techniques have been developed to enable the torque and the speed of a DC motor to be controlled over a wide range. For instance, with separate excitation of the windings, adjustable speed control is obtained by operating with a fixed field flux and varing the armature voltage. The no load speed is determined as the speed where the induced voltage is equal to the applied voltage.

Adjustable torque operation is obtained in a separately excited DC machine by controlling the value of the armature current. With a constant value of field flux, the torque is then directly proportional to the value of the armature current. If the armature current is provided from a current source, the torque can be adjusted as accurately and as rapidly as the armature current can be adjusted and controlled. On the other hand, in a three-phase Y connected AC induction motor, there are only four input connections, one to each stator winding and a neutral connection. The stator winding is connected to the supply and the polyphase currents circulating through the stator winding produce a magnetic field that rotates at synchronous speed. In a three-phase "squrrel-cage" motor, the rotor consists of a number of copper bars with their ends connected to stout copper end rings, causing them to be permanently short circuited on themselves. The lines of force of the stator field cut the rotor conductors to induce current causing the rotor to follow the stator field. The rotor winding is not directly accessible and rotor current is produced by induction rather than by a separately controlled source.

At no load, losses in the motor cause the rotor speed to be slightly less than the synchronous speed of the stator field. When a load is applied, the rotor speed slips behind the synchronous speed developing torque as a function of the difference in speeds. This difference is defined as "absolute slip". Another useful measure of slip is "fractional slip", defined as the absolute slip divided by the speed of the stator field. The frequency of the rotor currents is then the synchronous speed of the stator field (the line frequency) multiplied by the fractional slip. Slip may also be measured as a percentage. A motor operating with a slip of 0.02 may therefore be referred to as having 2% slip. In a typical induction motor, full load slip can vary between about 1% in high power motors (10 HP to 100 HP), up to 5% in fractional HP models.

The breakdown torque level represents the maximum torque available from the motor and any further increase in load can not be met by increases in slip. In normal operation with a line frequency voltage source, the full load operating torque of an induction motor is generally limited to about 50% of the breakdown torque to allow for reasonable variations in load. Since the speed of the motor is a function of the line frequency applied to the stator windings, a basic variable speed motor drive system requires a variable frequency power source. In addition, because a constant amplitude air gap flux provides optimum operating conditions for the motor, the amplitude of the input voltages applied to the stator windings should vary linearly with frequency to provide constant V/Hz operation. This technique is widely used in general-purpose applications where fast response time and rapid speed changes are not required. In these simple variable-speed systems, an inverter having an output that is controlled in both frequency and voltage normally provides the variable-frequency drive power required by the motor.

Two types of inverter are widely used in general purpose drives, the six-step inverter and the pulse-width modulated inverter. The six-step inverter typically uses six semiconductor switches in a bridge arrangement. The three-phase line voltage is full wave rectified to produce a DC voltage across a smoothing capacitor. Regulation of the voltage across the smoothing capacitor can be obtained by replacing the input rectifiers with phase controlled SCRS. In this way, the amplitude of the six-step output voltage applied to the motor can be controlled in proportion to the output frequency of the inverter. Gating on IGBT switches in the proper sequence produces the six-step line-to-neutral voltages. This amplitude of the waveforms increases as the frequency is increased. However, the performance of six-step motor drive systems becomes unsatisfactory at slow speeds, e.g. below 5 Hz, due to noticeable torque pulsations that prevent the smooth generation of power.

On the other hand, PWM inverters can simulate sine wave voltages more effectively and produce smooth variations in torque at the slower speeds. These PWM inverters typically employ variable duration high frequency voltage pulses having repetition frequencies between 5 kHz and 20 kHz. The switching command signals for producing the modulated pulses can be generated by comparing a sinusoidal waveform with a high frequency triangular waveform.

In order to improve the motor response performances, many newer PWM designs are using repetition frequencies above 10 kHz. However, these high frequencies have been shown to introduce serious problems in many applications. High frequency pulse currents, generated by the fast rise and fall times of the applied rectangular voltage waveforms, circulate in the motor and can cause break-down in the lubricating oil films, causing seizure of the rotor bearings. Fast switching voltage waveforms produced by pulse-width modulation can also cause corona breakdown in the insulation of the stator windings, and can create unacceptable levels of radiated and conducted EMI. At high power levels, the lengths of the connecting cables between the inverter and the motor are severely limited due to the reflections and distortions produced by the PWM waveforms. These problems do not exist with sinusoidal motor input waveforms.

A major objective of this invention is to demonstrate how true sine wave currents can replace pulse-width modulated sources in variable speed drive applications to improve the performance of the motor without affecting the motor life or producing objectionable levels of EMI.

In general purpose V/Hz variable speed drives, load variations on the motor are met by the 'slip' produced in the difference between the rotor and stator speeds. A change in output loading produces a change in slip that provides the required increase in output torque. When the motor is operated from a conventional voltage source, a sudden increase in the mechanical load results in a requirement for a fast increase in the rotor current to supply the increased torque. A delay in the rise of the rotor current can cause the breakdown slip to be exceeded thereby producing loss of control.

The problem of poor transient response time in general purpose (V/Hz) drives is widely recognized and has resulted in the development of complex motor control systems, variously called field oriented control or vector control. These systems control the flux producing and torque producing components of the stator currents by modulating the three phase voltage inputs applied to the stator windings through the pulse-width modulation. By using increasingly complex digital processing, substantially improved dynamic performance has been obtained. While vector control can provide fast control over a wide speed range, some important control problems still remain at slow speeds due to difficulties in determining the value of rotor resistance that can vary over a wide range due to rotor heating during operation.

In the present invention, fast response time of the motor is obtained by the direct control of the input currents to the motor rather than by the control of input voltages. Three phase sine wave currents are generated in series resonant inverters operating at a nominal repetition frequency of 25 kHz. However, the current output to each phase winding is generated by two rectified sine wave currents per inverter cycle, thereby producing typical ripple frequencies of 100 kHz. Since the modulated output frequency range of the current source inverters is determined by the speed range of the motor, this covers from DC at locked rotor to about 220 Hz for the stator frequency range, while the absolute slip frequency typically varies from zero to 6 Hz. Therefore, in the present invention, even at maximum speed, there are more than 400 inverter current packets during one cycle of the stator current waveform.

The operation of an induction motor is often compared with that of a transformer where the stator winding is regarded as the primary and the rotor winding becomes the secondary. Normally, transformers are used with voltage sources to step-up or step-down the voltage or to provide isolation between the primary and secondary circuits. However, in certain cases, transformers are used in series circuits where power is generated as a current source such as in a series resonant LC inverter circuit and the load current is produced in the secondary windings. In these cases where the primary winding is in series with the current source, the secondary circuits must be loaded, otherwise the primary appears as an open circuit. Similarly, if a short is placed across the secondary, the short is transferred to the primary and appears across the stator windings.

In an induction motor, the apparent rotor resistance varies with changes in speed, while in a transformer, the resistance of the secondary winding remains essentially constant. Since the rotor is essentially a shorted turn, the step-down ratio in the motor is directly related to the number of turns on its stator winding. When the rotor is at rest, its apparent rotor resistance reflected into the stator is extremely small even through its value is multiplied by the square of the turns-ratio. Under these locked rotor conditions, the fractional slip is unity and the input frequency of the supply must be less than the breakdown slip. When using a voltage source under locked rotor conditions, the magnitude of the applied stator voltage must also be limited to prevent exceeding the maximum permitted input current. Since the output torque generated by the motor at a given slip frequency is a function of the square of the rotor current and the value of its rotor resistance, it is more effective and safer to operate with a current source as described in this invention rather than to use a voltage source as in conventional variable speed drive systems. In fact, it will be shown that there are several advantages in operating the motor with a sine wave current source over the full range from locked rotor to maximum speed.

The sine wave current used in the present invention may be described as a current packet inverter since the invention uses variable size packets of current produced in series resonant inverters to modulate the current applied to the motor.

The control system allows the value of slip to be controlled over a wide load and speed range. Choosing the optimum value of slip is a compromise between operating with a high power factor and operating at the most efficient points on the torque/slip characteristic. To minimize the motor current for a particular value of torque, it is desirable to set the slip for operation close to the peak of the characteristic. When a family of torque/slip curves for different values of motor current are constructed, the optimum value of slip can be determined for a particular level of output torque.

When the application calls for control of torque, as in a motor vehicle drive system, there are several major advantages in using a sine wave current source rather than the pulse-width modulated voltage sources used in most vehicle applications. These include improved low speed performance because variations in rotor resistance no longer affect the value of rotor current, longer bearing and insulation life and less EMI interference compared with conventional PWM systems. By setting the value of slip in a current source drive system, output torque may be controlled by adjustment of input current.

Several examples of efforts to satisfy these requirements are described in the patents discussed hereafter. However, as is apparent, none of these teaches or suggests the improved power supply control of the present invention.

U.S. Pat. No. 5,684,678 shows a LC resonant circuit for a resonant converter including a resonant capacitor and an inductor coupled to a fixed frequency AC supply. A DC current to vary the inductance controls an inductor in parallel with the resonant capacitor. The DC current in the control winding produces core fluxes which effects core permeability. The controlled inductor has the effect of changing the capacitor impedance and thus influences the converter output.

U.S. Pat. No. 5,617,308 teaches a resonant link inverter control for driving a multi-phase induction motor through three feed lines each connected to opposite sides of a DC bus by a pair of switches. A resonant tank circuit connects a source of DC voltage through an inductor to the DC bus and provides a tank capacitor in parallel with the DC bus. A bipolar transistor having an anti-parallel diode, which is in series with a clamp capacitor to form a clamp circuit connected across the tank inductance, is turned off in response to the clamp current bearing a predetermined relationship to voltage across the clamp circuit as well as voltage across the DC source. The current in each feed line is sampled in response to clamp current, which is just slightly less than that which causes turnoff of the clamp transistor.

U.S. Pat. No. 4,805,081 shows an inverter system having two resonating current sources, which are resonant at the same frequency capable of being combined. At low power levels the currents are substantially out of phase and the frequency is adjusted. At intermediate power levels the currents are adjusted in phase and the frequency is fixed. At high power levels the currents are substantially in phase and the frequency is adjusted.

U.S. Pat. No. 5,689,164 discloses an inductor-capacitor series resonant circuit connected in series with an unidirectionally conductive semiconductor switch to form a resonant network, one resonant network for each stator phase winding of a switched reluctance motor to be connected in parallel to the stator phase winding. Zero current switching is achieved by selecting the resonant frequency such that the inductor and capacitor resonate in a time period during both turn-on and turn-off of the semiconductor switches.

U.S. Pat. No. 4,998,054 relates to a DC link resonant converter for controlling the speed of AC machines. Switch and power supply means is provided to establish a bi-directional initial current in the resonant circuit. By selecting the plurality and magnitude of the initial current, the peak voltage of the resonant link is controlled and reliable zero crossing of the resonant voltage is assured.

U.S. Pat. No. 5,777,459 teaches an induction electrical power generation system for generating alternating current varying within a frequency range comprising an induction electrical generator for generating alternating current having a rotor and stator. The stator includes at least one phase winding to output the generated alternating current and a plurality of poles with at least two different numbers of poles within the plurality of poles being selected to generate the alternating current. An exciter-winding wound on the stator is driven by AC excitation, which varies in frequency during generation of the alternating current and the rotor operating with slip during the generation of the alternating current. A variable speed drive is coupled to the rotor for driving the rotor in a speed range during generation of the alternating current. A controller is coupled to the inverter and responsive to the rotor speed signal for commanding variation of the excitation frequency as a function of the rotor speed signal.

U.S. Pat. No. 5,734,250 shows a device for controlling a three-phase induction motor driven by an inverter connection. A full-wave rectified grid alternating voltage supplied to the inverter is arranged to be supplied to respective motor phase through an electronic switch connection such that respective "on" and "off" periods are determined by the drive frequency which is generated by an oscillator device.

U.S. Pat. No. 5,668,707 and U.S. Pat. No. 5,587,892 relate to a multi-phase AC to DC harmonic neutralizing power converter comprising a plurality of non-isolated inputs for respective phases of a multi-phase source of AC power and a plurality of first rectifiers connected respectively to the inputs. A multi-phase harmonic neutralizing converter includes a power switching inverter including LC resonant circuits having an input connected to the outputs of each of the first rectifiers. A plurality of second rectifiers connected to the output of the inverter through a plurality of respective transformers are connected in voltage additive relationship to the outputs of the respective individual phase first rectifiers.

The following patents are additional examples of such prior art: U.S. Pat. No. 4,843,296; U.S. Pat. No. 4,999,561; U.S. Pat. No. 5,280,421; U.S. Pat. No. 5,371,668; U.S. Pat. No. 5,440,219 and U.S. Pat. No. 5,629,598.

Extensive development efforts have been undertaken over the past twenty years to improve the inherently slow response times inherent in V/Hz variable speed AC motor drives. These have included vector control techniques that maintain the phase of the air-gap flux linkages in the motor while controlling the magnitude and frequency of the stator and rotor currents. In essence, vector control systems take the speed and position information of the rotor from a transducer, and use pulse width modulated inverters to control the magnitude, frequencies and the phases of the currents applied to stator windings to produce the desired amount of output torque. This is a complex process requiring the application of space vectors, coordinate transformations and complex machine models.

Additional complications are introduced by the use of pulse width modulation to synthesize the three phase sine waves applied to the motor since the timing of the switching frequency in the inverter must also be taken into consideration. The fast rise time pulses applied to the motor from the pulse width modulator can also cause failures in the motor bearings, insulation breakdown in the stator windings and produce EMI radiation into adjacent equipment. Remote operation between the inverter and the motor can be severely limited due to distortion of the inverter pulses in the inductance of the connecting cables. The problems generally associated with variable speed drive systems suggest that a different approach should be developed to provide the three-phase input power to the motor. Such an approach is the subject of the current source system described in this application. The inherent problems and constraints that are evident with V/Hz and vector control systems do not exist with current source sine wave drive systems that operate effectively at all power levels and do not produce high frequency pulse components that can cause damage to the motor. Control at slow speeds is unaffected by variations in stator winding resistance.

Pulse width modulation is not required in current source control systems. Fast rise time voltage pulses are replaced with true sine wave input currents, thereby eliminating EMI interference problems, and preventing motor damage caused by the input pulses. Also, the motors run cooler with sine wave inputs.

The instant control system allows independent adjustments of the stator current and slip frequency in an induction machine. In this way, direct control of torque is obtained by applying the data from a family of curves depicting torque versus slip frequency characteristics for different values of stator current. These curves may be derived from tests performed on an actual motor or from data supplied by the motor manufacturer.

SUMMARY OF THE INVENTION

The present invention relates to a variable output induction motor drive system for use with a polyphase variable output alternating current motor. Instead of using six step or pulse-width modulation to synthesize a sine wave voltage in a V/Hz or vector control drive, actual sine waves of current are fed to the polyphase variable output alternating current motor for the efficient control of speed and torque throughout the operating range of the polyphase variable output alternating curent motor from standstill to maximum speed.

Alternatively, in general purpose applications that use simple V/Hz control systems, actual sine waves of voltage can be generated by using a voltage feedback control instead of current feedback to control the power inverters.

The use of sine wave modulation instead of pulse-width modulation to drive the polyphase variable output alternating current motor eliminates many problems created by high frequency PWM rectangular pulses. Sine waves do not contain the fast rise time transient currents or voltages inherent in pulse-width modulation that produce excessive EMI interference in adjacent equipment or cause bearing and insulation failures in the motor.

The variable output induction motor drive system of the present invention employs a series resonant power inverter arrangement and a reverse power control that effectively provide four quadrant operation essential to effectively drive the input impedance of an induction motor that produces a phase current lag as a function of the motor power factor. This phase relationship causes a polarity shift between the motor current and voltage during a portion of each cycle. The series resonant power inverter arrangement supplies the sine wave power to the polyphase variable output alternating current motor over the major portions of the sine wave power cycle when the voltage and current have the same polarity. The reverse power control circuit supplies the motor current during that portion of the sine wave power cycle when the voltage and current are of opposite polarity.

The power factor of an induction motor under normal operating conditions typically varies between about 0.75 and about 1.0 depending on the slip and the load conditions of the motor. The reason the motor power factor is not constant is because its value depends upon the ratio of the input reactance to the input resistance. The input reactance varies directly with input frequency and the input resistance varies according to the ratio of the input frequency to the slip frequency. This means that the effective resistance of the rotor increases as the slip is reduced. Control circuits modulate the power source output currents both from the series resonant inverter arrangement and the reverse power control circuit to produce sine wave outputs at frequencies from about a few Hz at locked rotor to more than 220 Hz when switching at frequencies from about 15 kHz to about 50 kHz. A three phase system is programmed to produce variable frequency and variable amplitude sine waves of current or voltage suitable for driving a three phase variable speed induction motor. Because the sine wave generators, amplitude controllers and power amplifiers are directly coupled, it is also possible to apply controlled values of DC current to the motor to provide moderate dynamic braking.

The control system is capable of controlling the magnitude of slip generated in the polyphase variable output alternating current motor. This allows the polyphase variable output alternating current motor to operate under efficient conditions and by holding the slip at a substantially constant value, the torque may be directly controlled by adjusting the magnitude of the input current to the polyphase variable output alternating current motor.

In summary, the instant invention contemplates three variable output power inverters each with a reverse power control circuit including modulation to produce sine wave outputs of current with independent control of amplitude and frequency required for optimum performance of induction motors. The power source inverters use series resonant circuits to produce two high frequency sine wave current sources, typically operating at 25 kHz, that are subtracted or added to control the resulting output power from zero to maximum, at efficiencies greater than 90%. The series resonant and reverse power control or circuits normally produce a current source using a current feedback signal from the polyphase variable output alternating current motor. The present invention can also provide a voltage source by using feedback of the output voltage from the polyphase variable output alternating current motor.

An output transformer used in each inverter power stage may include taps that can be selectively switched to provide an optimum match between the power source and the polyphase variable output alternating current motor. By changing the transformer turns ratio, more efficient transfer of power is possible over a wide speed range, effectively providing an electronic gearbox that generates higher torque at slow speeds and higher output voltages at high speeds where field weakening is normally experienced.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
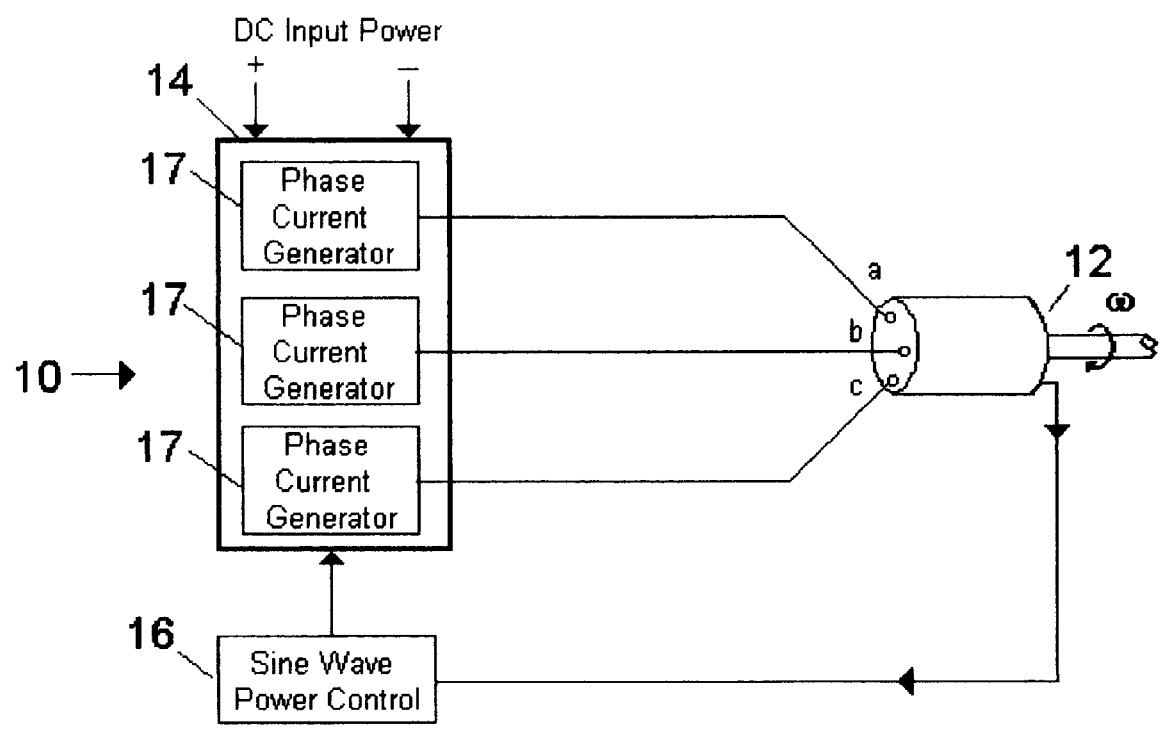
FIG. 1 is a block diagram of the phase sine wave current generator of the variable output induction motor drive system of the present invention and a polyphase variable output alternating current motor.

As shown in FIG. 1, the present invention relates to a variable output induction motor drive system generally indicated as 10 for use with a polyphase variable output alternating current motor 12 including a rotor and stator to drive an operating load (not shown) such as an automotive vehicle. The variable output induction motor drive system 10 comprises a sine wave current generator 14 including circuitry to generate a variable sine wave current operatively coupled to a direct current power source (not shown) to receive direct current therefrom and operatively coupled to the polyphase variable output alternating current motor 12 to selectively feed the variable sine wave current thereto. A sine wave power control 16 is coupled to the sine wave current generator 14 and to the polyphase variable output alternating current motor 12 to monitor the operating parameters of the polyphase variable output alternating current motor 12 and to control the amplitude and frequency of the variable sine wave current generated by the sine wave current generator 14 and fed to the polyphase variable output alternating current motor 12 to control the output torque and speed thereof. As described more fully hereinafter, the sine wave current generator 14 comprises a phase sine wave current generator 17 for each phase of the polyphase variable output alternating current motor 12.

The instant invention is particularly suited for use with electric automotive vehicles. To reduce or eliminate the harmful effects of pollution, efforts are being made to develop variable speed drive systems for use in cars, buses and trucks. Existing PWM drive systems that convert DC input voltages from a battery or a fuel cell produce synthesized variable frequency, variable amplitude inputs to an induction motor to power the vehicle having several operating limitations previously discussed.

As described more fully hereinafter, the variable sinusoidal output induction motor drive system 10 of the present invention has several significant operating capabilities not found in existing PWM based drive systems including sinusoidal exciation providing enhanced motor performance with longer bearing and insulation life, lower core loss and allowing the use of longer motor drive cables; improved system/circuit implementation whereby the use of a single high frequency carrier (packet transfer) technology allows the use of small high frequency transformers which, in turn, gives electrical isolation and makes possible electronic gear shifting; sinusoidal current source excitation allowing direct control of the induction motor stator current in both frequency and amplitude to give faster transient response and low speed stability relative to existing PWM vector control implementations; constant slip operation wherein the use of a selectable constant slip control format combined with sinusoidal current source excitations provides enhanced motor transient response and stability with reliable locked rotor and low speed torque and maximum torque per unit stator current over the entire motor speed range, thus leading to better motor efficiency and the optimum use of motor material, reduced motor size; and electronic tachometer allows the direct measurement of the voltage/current phase angle, which, combined with constant slip control, providing accurate calculation of rotor speed, giving precise control of rotor speed without the need for motor shaft monitoring. Furthermore, the use of a current source provides better control characteristics during vehicle start-up and at slow speeds. In addition, the present invention allows for the implementations of an electronic gearbox not practiced with PWM systems.

Figure 2:
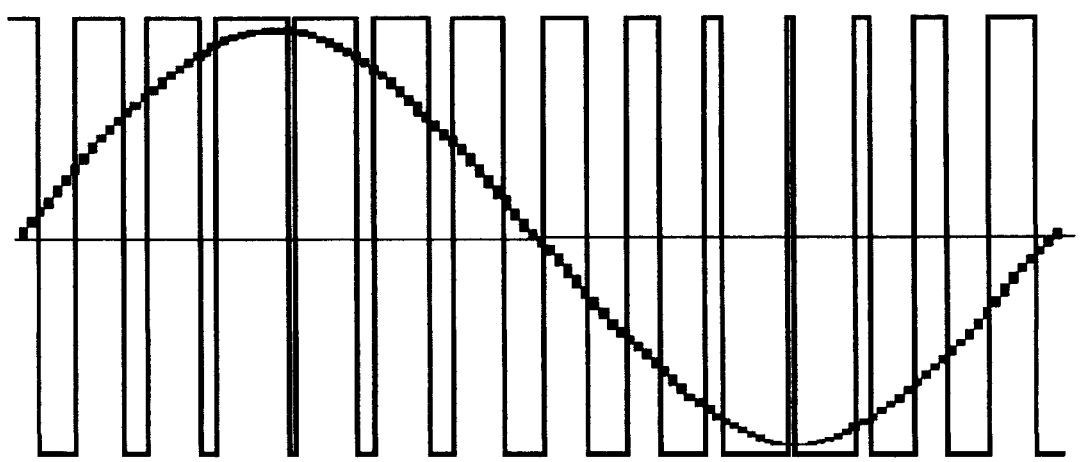
FIG. 2 shows the waveforms of a pulse width modulated method of producing a sine wave.

It should be recognized that a significant difference between the variable output induction motor drive system 10 of the present invention and the prior art PWM systems lies in the manner in which the power is modulated. PWM systems generally use a modulation scheme to produce the synthesized sine wave as shown in FIG. 2.

In contrast, the present invention modulates the output of a DC power supply (not shown) with a DC amplifier controlled by a control signal at sine wave frequencies over a range from a few Hertz to more than 200 Hz with high conversion efficiency. The power source or modulator must also be capable of operating in all four quadrants regardless of the lagging power factor of the polyphase variable output alternating current motor 12. The sine wave power modulator and the reverse power control described hereinafter are capable of driving output loads which can vary from a short circuit to an open circuit with a power factor from about 0.75 to about 1.0.

Figure 3:
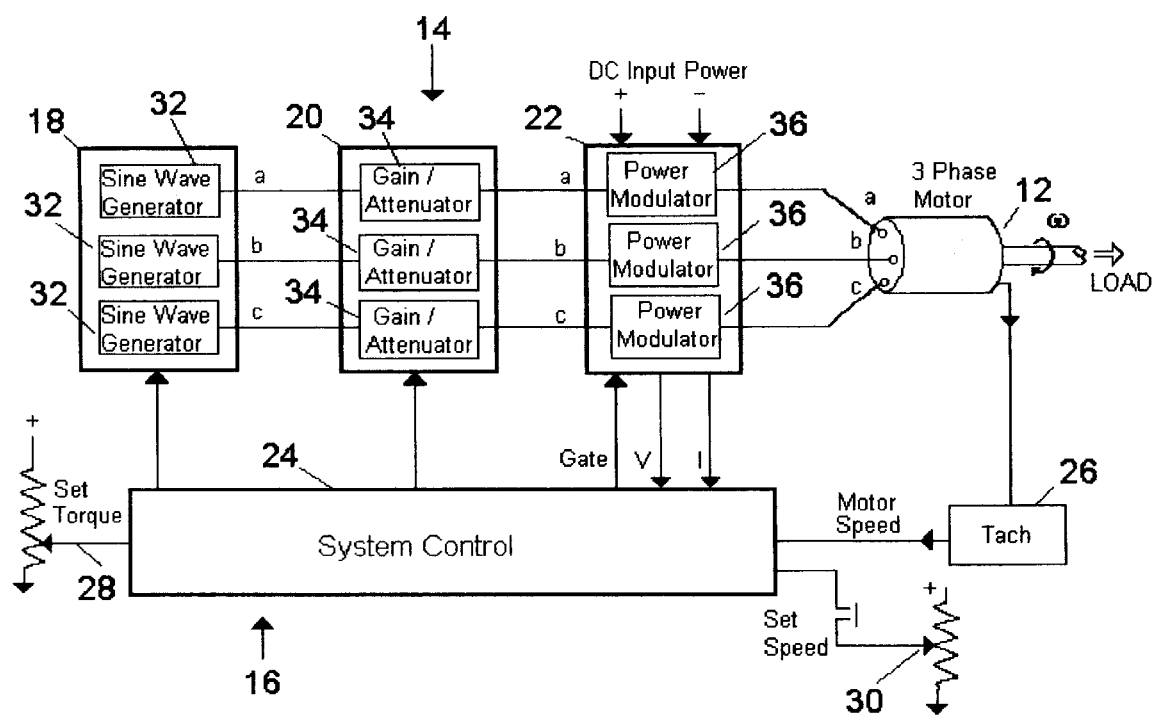
FIG. 3 is a block diagram of the variable output induction motor drive system of the present invention.

As shown in FIG. 3, the sine wave current generator 14 comprises a frequency control stage 18, an amplitude control stage 20 and a power control stage 22. The sine wave power control 16 comprises a system control 24 including means to monitor and control the operation of the polyphase variable output alternating current motor 12, an operating parameter detector or monitor 26 to determine rotor speed such as a mechanical or electronic tachometer operatively coupled between the polyphase variable output alternating current motor 12 and the system control 24, and a system operating control including a first torque control input device 28 and a second torque control input device 30.

Figure 4:
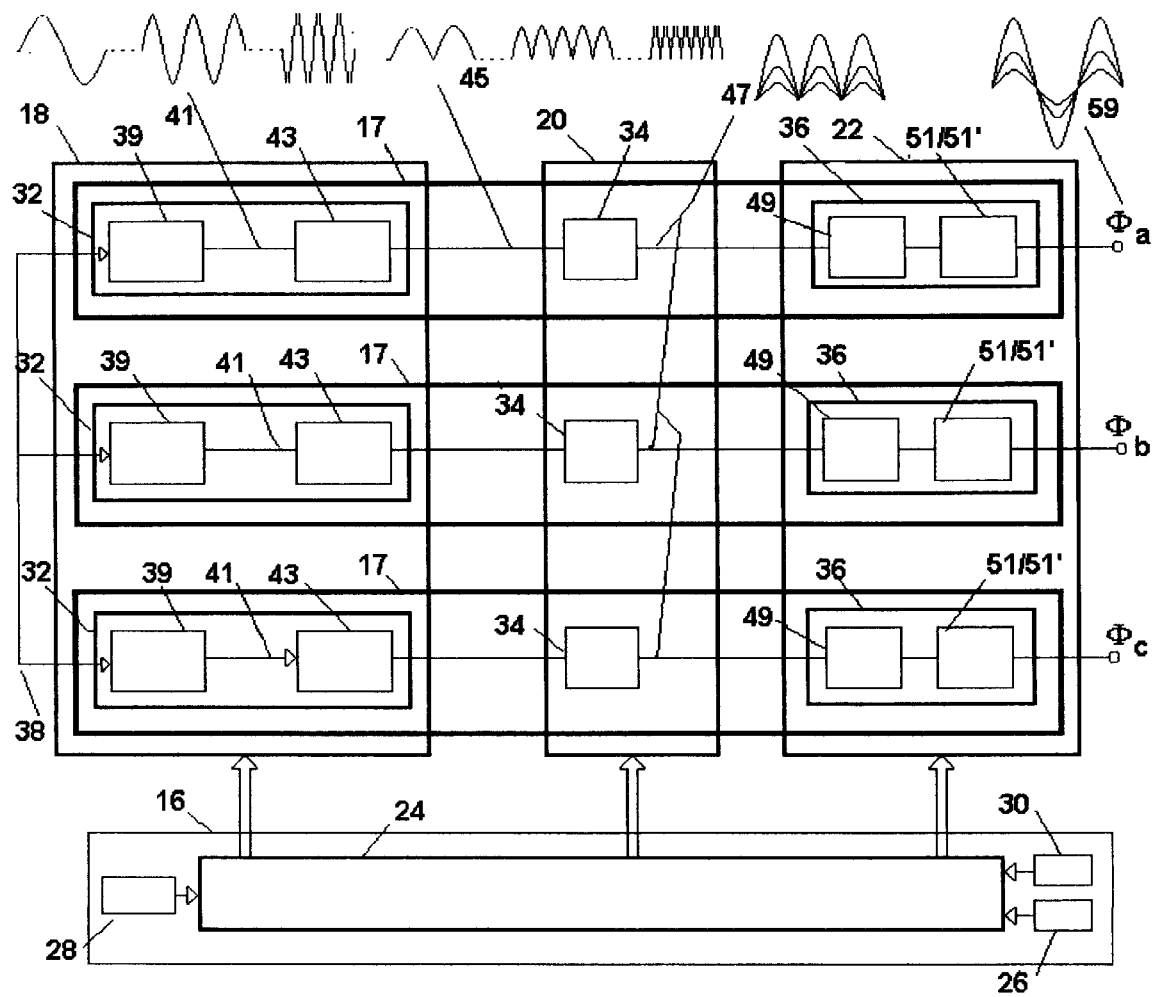
FIG. 4 is a detailed block diagram depicting the three sine wave generator stages and the sine wave power control of the present invention.

As shown in FIGS. 3 and 4, the frequency control stage 18 comprises a plurality of frequency control generators each indicated as 32 to generate a constant amplitude, variable frequency rectified signal 45. The amplitude control stage 20 comprises a plurality of amplitude control generators each indicated as 34 to control the amplitude of the constant amplitude, variable frequency rectified signal 45 from the corresponding frequency control generator 32 to generate a variable frequency, variable amplitude rectified signal 47. The power control stage 22 comprises a plurality of power control generators each indicated as 36 to modulate the DC input power from the DC power source (not shown) with the variable frequency and variable amplitude rectified signals from the corresponding amplitude control generators 34 to generate a variable frequency, variable amplitude sine wave current signal 59 shown in FIG. 4.

As shown in FIG. 4, corresponding frequency control generators 32, amplitude control generators 34, power control generators 36 and reverse power unit 51/51' cooperatively comprise the corresponding phase sine wave current generator 17 for each corresponding phase a, b, c of the polyphase variable output alternating current motor 12 as shown in FIGS. 1 and 3.

As shown in FIG. 4, each frequency control generator 32 comprises a sine wave generator section 39 to generate a variable frequency sine wave 41 and a rectifier section 43 to rectify the variable frequency sine wave 41 to generate the variable frequency rectified signal 45 fed to the corresponding amplitude control generator 34 of the amplitude control stage 20.

The sine wave generator section 39 and the amplitude control generators 34 can be selected from those used in prior art variable speed drives. In contemporary designs, these functions can be performed either in the same microprocessor used for the system control 24 or in analog semi-custom linear integrated circuits. For example, functions of the sine wave generator sections 39 and the amplitude control generators 34 of the present invention may be performed by a Micro Linear ML2038 programmable sine wave generator and a Micro Linear ML2003 amplitude or gain/attenuator respectively.

Each sine wave generator section 39 produces the sinusoidal waveform 41 having peak-to-peak output voltages that remains at a substantially constant peak to peak amplitude of about 1 volt at all frequencies synchronized from a common system clock signal 38 from the sine wave power control 16 so that the output frequencies are locked together.

The output phases of each phase sine wave current generator 17 are gated from the system control 24 so that the waveforms of each phase sine wave current generator 17 are phase shifted by 120 degrees relative to each other. The constant amplitude variable frequency sine waves 41 generated by the corresponding digitally controlled Micro Linear ML2038 or sine wave generator section 39 are rectified by the corresponding rectifier section 43 and applied to the corresponding amplitude control generator 34 as the variable frequency rectified wave 45.

The amplitude of the variable frequency rectified wave 45 is then increased or decreased by the corresponding amplitude control generator 34 to generate the variable frequency, variable amplitude rectified signal 47 applied to the corresponding power control generator 36. In this way, the variable frequency, variable amplitude rectified signals 47 fed to each of the power control generators 36 are digitally controlled in frequency from about 1 Hz to about 220 Hz in increments or steps of, for example, 0.24 Hz and digitally controlled in amplitude over a range of about 50 dB in increments of about 0.1 dB to control the corresponding power control generator 36.

As shown in FIG. 4, each power control generator 36 comprises a power modulator or series resonant inverter 49 and a corresponding reverse power control 51/51'.

Figure 5:
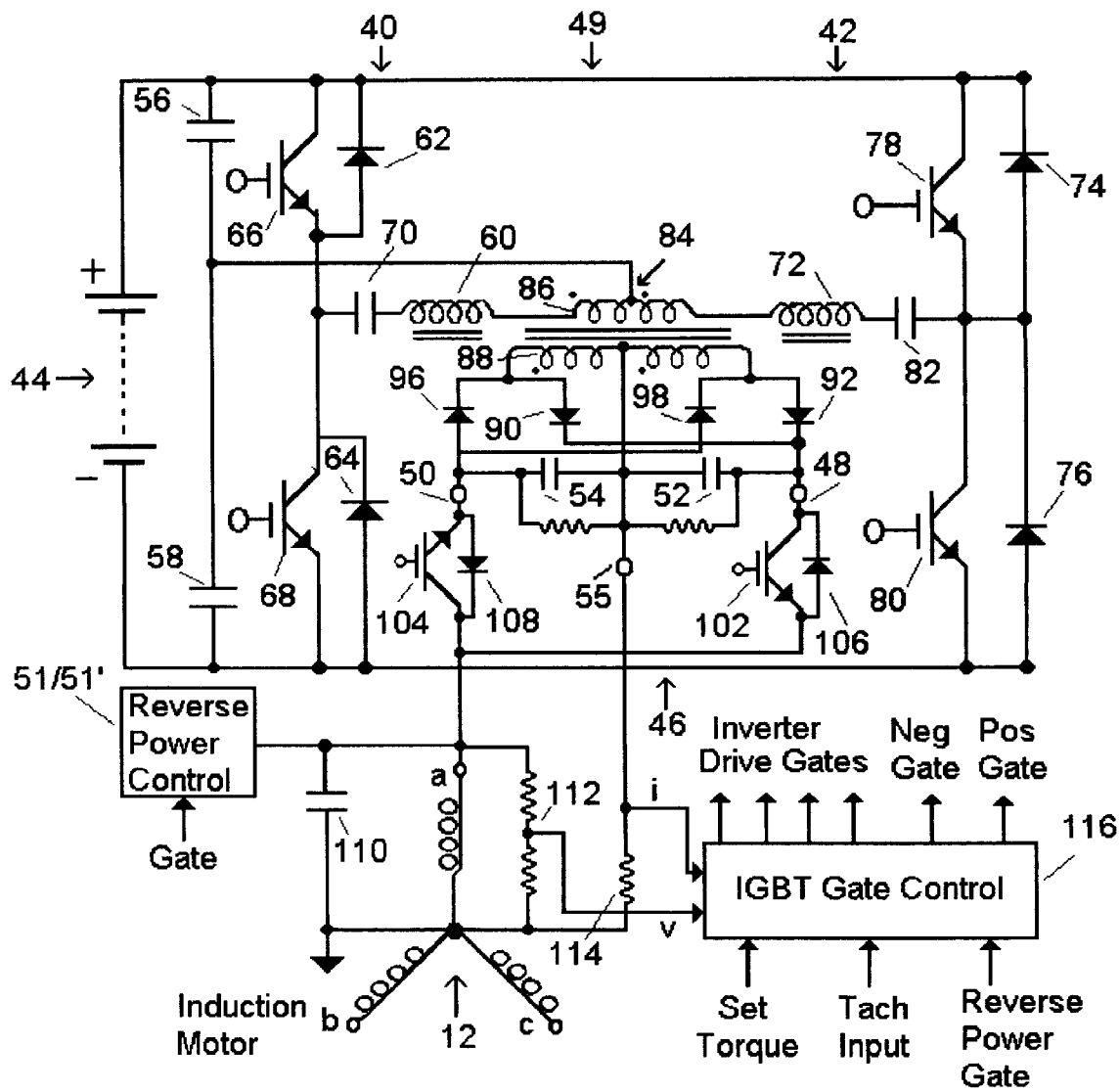
FIG. 5 is a circuit diagram of a power modulator and output stage of the present invention.

As shown in FIG. 5, each series resonant inverter 49 comprises a first and second resonant inverter stage generally indicated as 40 and 42 respectively operatively coupled to a DC power input stage generally indicated as 44 and the polyphase variable output alternating current motor 12 through an AC power output stage generally indicated as 46. The AC power output stage 46 comprises a positive and a negative rectified DC output terminal indicated as 48 and 50 respectively and a corresponding output capacitor indicated as 52 and 54 respectively coupled to a center terminal 55. As shown in FIG. 5, the DC power input stage 44 comprises a first and second input stage capacitor indicated as 56 and 58 respectively.

Figure 6:
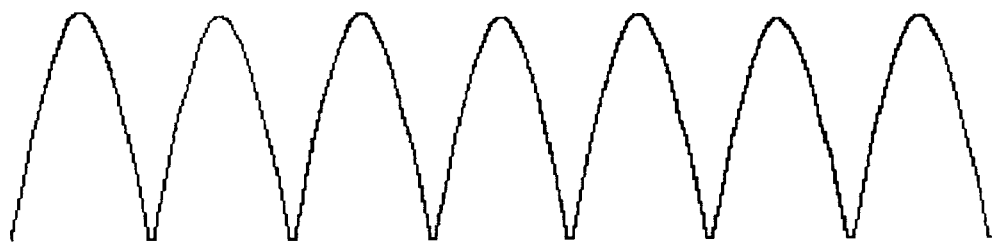
FIG. 6 depicts the rectified sine waveform applied to each power modulator stage of the present invention.

In order to provide AC power to the polyphase variable output alternating current motor 12, the output terminals 48 and 50 are modulated by the half wave rectified sine wave control signal generated in the system control 24 shown in FIG. 6 and as waveform 47 in FIG. 4. The gating signal in FIG. 7 directs successive half cycles generated in the push-pull output terminals 48 and 50 of the power control generator 36 to produce the full sine waveform shown in FIG. 8, and as waveform 59 in FIG. 4. During the reverse power portions of the cycle, the series resonant inverter 49 is gated off and is replaced by reverse power control 51/51'.

As shown in FIG. 5, the first resonant inverter stage 40 comprises an inverter inductor 60, a first and second inverter diode indicated as 62 and 64 respectively, a first and second resonant inverter IGBT indicated as 66 and 68 respectively and an inverter capacitor 70; while, the second inverter stage 42 comprises an inverter inductor 72, a first and second inverter diode indicated as 74 and 76 respectively, a first and second series resonant inverter IGBT indicated as 78 and 80 respectively, and inverter capacitor 82.

The sinusoidal currents from the first and second resonant inverter stages 40 and 42 are combined in a transformer generally indicated as 84 including a primary winding 86 and a secondary winding 88. The push-pull secondary outputs between positive rectified DC output terminal 48 and center output terminal 55, and the negative rectified DC output terminal 50 and center output terminal 55 are full wave rectified by diodes 90 and 92 to produce a positive output across smoothing capacitor 52, and by diodes 96 and 98 to produce a negative output across smoothing capacitor 54, respectively.

FIG. 5 also shows the AC power output stage 46 for each phase a, b, c operatively coupled between the corresponding power control generator 36 shown in FIG. 4 and the corresponding phase of the polyphase variable output alternating current motor 12 through which the positive output waveforms from terminal 48 are gated through a positive IGBT gate 102 and the negative output waveforms from terminal 50 are gated through a negative IGBT gate 104. Positive and negative reverse conducting diodes 106 and 108 are coupled across the positive IGBT gate 102 and the negative IGBT gate 104 respectively. The following is a description of the gating sequence for the positive rectifer 102, the negative rectifier 104, the power modulator 49 and the two reverse power control 51/51'. The power modulator 49 and the positive rectifier 102 are gated ON at the zero crossing of the phase current (point 'c' in FIG. 12) and both are gated OFF again at the negative crossing of the phase voltage (point 'f'). During the time interval from point 'f' to point 'g' the reverse power unit (FIG. 14) is ON. Next, at point 'g', the power modulator 49 and the negative rectifier 104 are gated ON and remain ON until the positive zero crossing of the phase voltage at point 'b'. During the time interval from point 'b' to point 'c' the reverse power control of FIG. 13 is ON to provide the phase current and at point 'c' the power modulator 49 and the positive rectifier 102 are gated ON again and remain on to point 'f', which completes the cycle. The gating signals sequence described above is shown in detail in FIG. 25. The timing of the zero crossing of the phase voltage and phase current is derived by the reference generators 112 and 114 of FIG. 5. A smoothing capacitor 110 smooths the sinusoidal waveform which is coupled to the corresponding phase of the polyphase variable input alternating current motor 12 to receive the variable sinewave current 59.

FIG. 5 also shows a portion of the system control 24 including a system feedback means having a voltage reference generator or voltage divider 112 to generate a voltage reference or voltage feed back signal and a current reference generator or current resistor 114 to generate a current reference or current feedback signal fed to the IGBT gate control stage 116 to control operation of the variable output induction motor drive system 10 as described more fully hereinafter.

In operation, gate drive pulses from IGBT gate control stage 116 of the system control 24 are sequentially applied to the first and second resonant inverters IGBT 66 and IGBT 68 of the first inverter stage 40 and to the first and second resonant inverters IGBT 78 and IGBT 80 of the second inverter stage 42.

Figure 9:
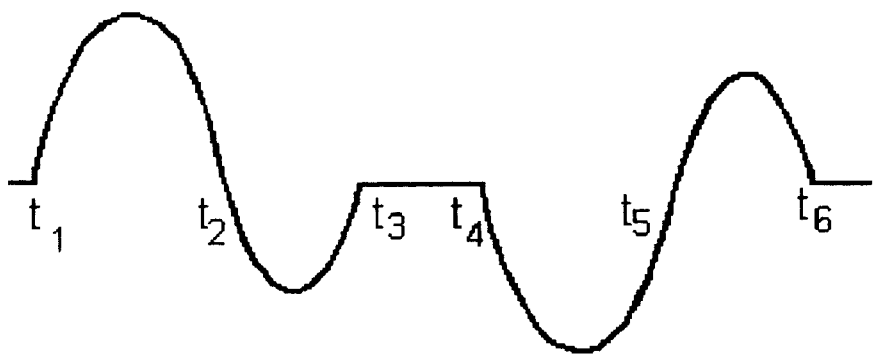
FIG. 9 depicts a complete cycle of the high frequency sinusoidal current waveform generated by a series resonant inverter stage of each power modulator of the present invention.

The inverter waveform shown in FIG. 9 depicts both the first and second resonant inverter stages 40 and 42 waveforms. The first resonant inverter IGBT 66 of the first resonant inverter stage 40 is gated on at time $t_1$ and continues to conduct until the reversal of current at $t_2$. Reverse current then flows through the first inverter diode 62 until time $t_3$, when the first inverter diode 62 turns off. Circuit action then stops in the 'dead time' between $t_3$ and $t_4$ until the next gate pulse is applied to second resonant inverter IGBT 68 of the first resonant inverter stage 40. The current waveform in second resonant inverter IGBT 68 and the second inverter diode 64 between $t_4$ and $t_6$ then mirrors the previous shape produced in first resonant inverter IGBT 66 and the first inverter diode 62 in the opposite polarity since the DC supply voltage is reversed. After $t_6$, the first resonant inverter IGBT 66 is turned on again following the 'dead time', $t_6$ and $t_1$, and the inverter cycle then repeats. Note that the 'dead time' periods are determined by the timing of the gate pulses to the first and second resonant inverters IGBT 66 and 68 and adjustment of this period controls the repetition frequency of the first series resonant inverter stage 40. Typically, the resonant frequency of the LC circuit is 50 kHz, so the half cycle period between $t_1$ and $t_2$ is 10 us. For a repetition frequency of 20 kHz, the 'dead time' between $t_3$ and $t_4$, and between $t_6$ and $t_1$ is then 5 uS.

The second resonant inverter stage 42 operates similarly according to the timing of the gate drive pulses applied to the first and second resonant inverter IGBTs 78 and 80 to produce sinusoidal current waveforms identical to those in first series resonant inverter stage 40 except the first and second series resonant inverter IGBTs 78 and 80 of the second series resonant inverter stage 42 are gated with a phase displacement relative to the first and second resonant inverter IGBTs 66 and 68 of the first series resonant in inverter stage 40.

Typically, the first and second series resonant inverter stages 40 and 42 are operated in discontinuous condition as shown in FIG. 9, where there is 'dead time' between the sinusoidal currents ($t_1$–$t_3$) and ($t_4$–$t_6$) in the first and second resonant stages 40 and 42. Higher power is obtained when the 'dead times' are reduced to zero and the repetition frequency is then 25 kHz. Even higher output power is possible if the first and second inverter IGBT 66 and 68, and first and second inverter IGBTs 78 and 80 waveforms overlap the first and second inverter diodes 62 and 64 and first and second inverter diode 74 and 76 waveforms respectively which causes the repetition frequency to be increase further.

Figure 10:
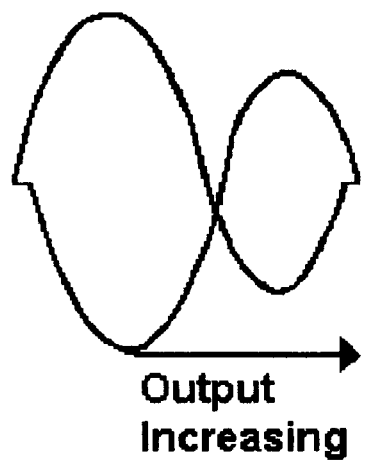
FIG. 10 depicts the output current of each power control modulator of the present invention when the series resonant inverter stages are substantially out of phase.
Figure 11:
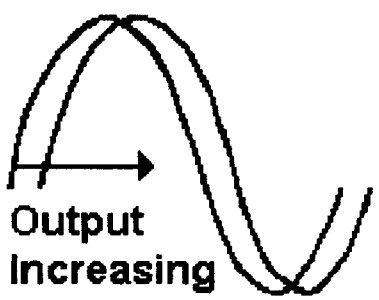
FIG. 11 depicts the output current of each power control modulator of the present invention when the series resonant inverter stages are substantially in phase.

By adjusting the phase of the currents from the corresponding first and second series resonant inverter stages 40 and 42, the phase difference controls the combined output current from zero to the maximum current. The result is two sets of substantially identical sinusoidal current waveforms that are phase shifted relative to one another and combined in the output transformer 84 of the AC power output stage 46 shown in FIG. 5. Thus, when the currents of the first and second series resonant inverter stages 40 and 42 are substantially canceled, as depicted in FIG. 10, the resulting output current signals 59 for each phase a, b, c are small and the average value applied to a the polyphase variable output alternating current motor 12 coupled to the AC power output stage 46 is correspondingly small or minimum. However, as the currents are brought increasingly into phase as depicted in FIGS. 10 and 11, the currents of the first and second series resonant inverters 40 and 42 become more additive, and maximum output current signal 59 as shown in FIG. 4 for each phase a, b, c is applied to the polyphase variable output alternating current motor 12 when the two resonant inverters 40 and 42 are virtually in phase. The waveforms shown in FIGS. 10 and 11 depict the inverter currents taking into account the canceling effect of the center-tapped primary winding 86 in the output transformer 84. Cancellation therefore occurs when IGBT 66 and IGBT 78 are gated on simultaneously, while maximum output current occurs when IGBT 66 and IGBT 80 are gated on simultaneously.

In this way, the currents in the first and second resonant inverter stages 40 and 42 can be efficiently controlled and averaged from low values of current up to the maximum available current simply by controlling the relative phase of the sine wave currents in the first and second resonant inverter stages 40 and 42 of the corresponding power modulator 49. Since it is difficult to obtain complete phase cancellation of the sine wave current from the corresponding first and second resonant inverter stages 40 and 42, a nominal difference exists when the output current of any corresponding power modulator 49 is less than about 1% of the maximum current value. At this point, the repetition frequency of the inverter is typically at 20 kHz, and further reduction in output current is obtained by reducing the repetition frequency of the first and second resonant inverter stages 40 and 42.

It should be noted that this resonant inverter arrangement can only operate in one quadrant, and therefore the input control voltage can only be applied in one polarity. However, because the output waveforms are sinsusoidal, each negative half cycle is a mirror of the positive half cycle. By using a center-tapped winding on the secondary of the output transformer 84, the first and second resonant inverter stages 40 and 42 can simultaneously provide both positive and negative rectified outputs to produce the sine waveform shown in FIG. 8.

There is, however, a problem introduced by the power factor of the polyphase variable output alternating current motor 12. The motor inductance causes the current in the polyphase variable output alternating current motor 12 to lag the voltage. During certain portions of the power cycle, the voltage is positive when the current is negative and visa versa. Since the series resonant inverter stages 40 and 42 or power modulators 49 can only supply loads where the voltage and current are in the same polarity, the reverse power control or circuit 51/51' is required to provide a controlled load that can maintain the sine wave current in the motor windings when the input voltage and current for any phase are of opposite polarity.

Figure 12:
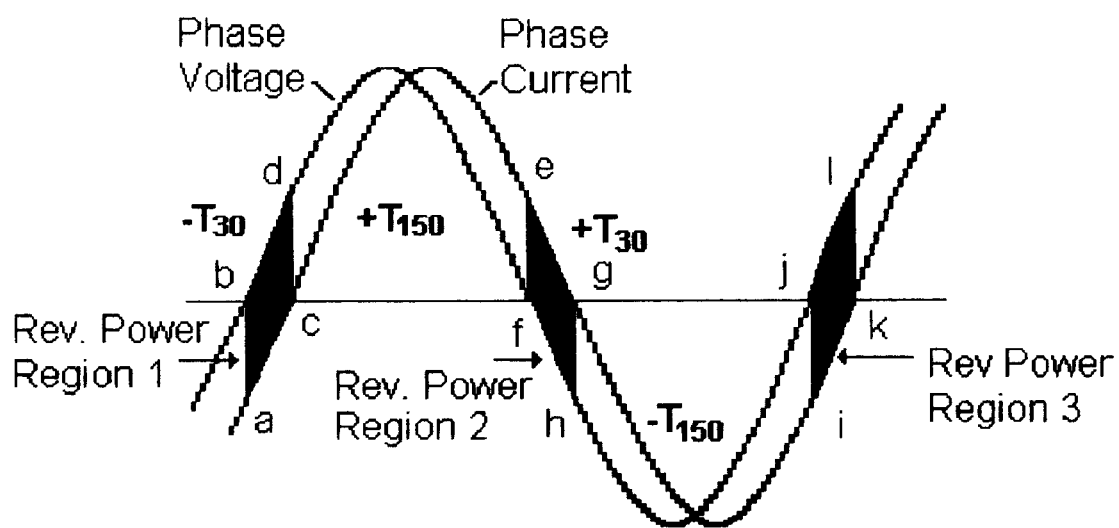
FIG. 12 depicts the induction motor voltage/current phase relationship at the stator input terminals of the polyphase variable input alternating current motor.
Figure 13:
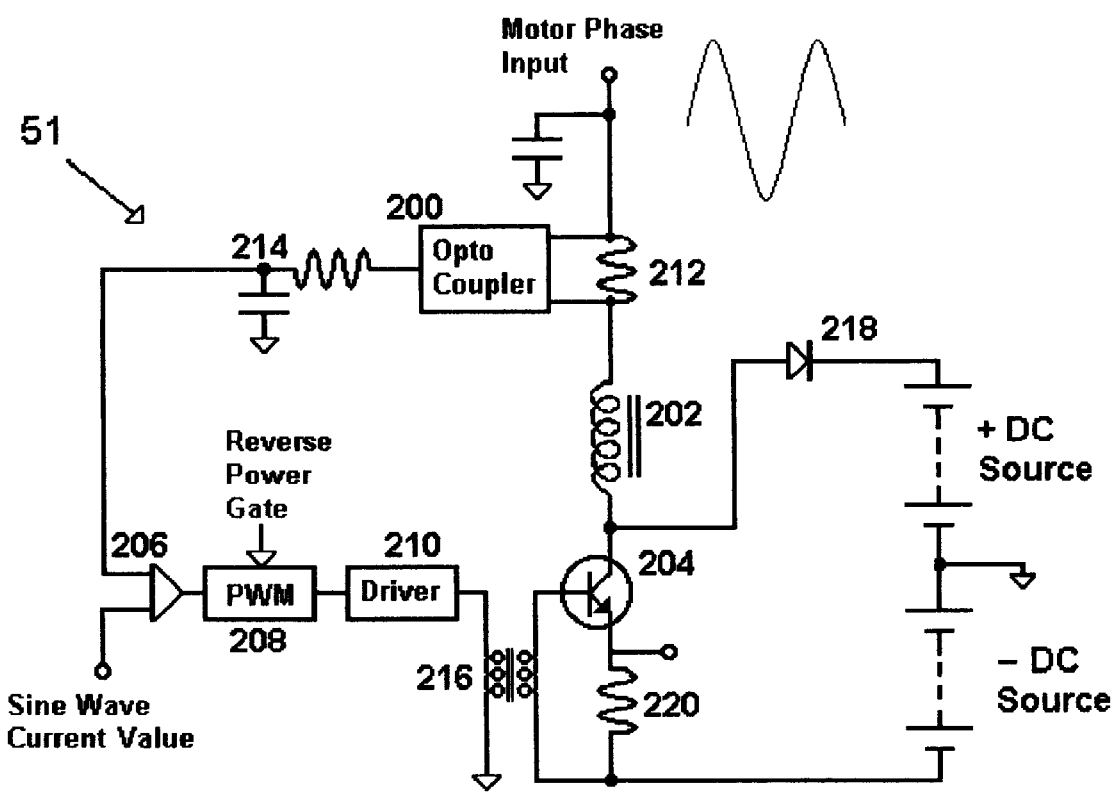
FIG. 13 is a circuit diagram of the first reverse power control of the present invention.

FIG. 12 shows the phase relationship between the voltage and current in each of the phases a, b, c of the polyphase variable output alternating current motor 12 when operating with variable sine wave current from the power modulator 49 or series resonant inverter stages 40/42 of each power control generator 36 during the unshaded areas and from the reverse power unit 51/51' during the shaded areas.

As previously described, the power modulator or series resonant inverter 49 of each corresponding power control generator 36 can not supply the current required by the polyphase variable output alternating current motor 12 in the reverse power regions shown as the shaded areas in FIG. 12 where the voltage and current are opposite polarity. In order to maintain a continuous or uninterrupted sine wave current signal 59 flow to each phase a, b, c the polyphase variable output alternating current motor 12, the power modulators or series resonant inverters 49 are shut off by the system control 24 when operating in the respective reverse power regions. Reverse power is then fed from one phase of the polyphase variable output induction motor 12 operating in the region of opposite polarity through the variable output induction motor drive system 10 to the other two phases of the polyphase variable output induction motor 12.

When any phase is operating in a reverse power region, the system feed back signals means in the sine wave power control 16 are fed to system control 24 that uses the feedback signals from the voltage and current of the polyphase variable output induction motor 12 to control operation of the corresponding reverse power control 51/51'. As shown in FIG. 5, the voltage divider 112 generates a voltage reference or voltage feedback signal and the current reference generator 114 generates a current reference or current feedback signal corresponding to the voltage and current values respectively of the variable output induction motor drive system 10. In addition, the sine wave current signal from the power modulator or series resonant inverter 49 of each power control generator 36 is used to determine the motor terminal voltage and current. Further, these reference zero crossing feedback signals are used by the IGBT gate control stage 116 of the system control 24 to produce gating pulses that start when the voltage waveform passes through zero and terminate when the corresponding phase current passes through zero.

As depicted in FIG. 12, the first reverse power region shows the voltage polarity transitioning positive starting at 'b' on the phase voltage waveform and the current transitioning position starting at 'c' on the phase current waveform. Similady, the second reverse power region shows the polarity transitioning negative starting when the phase voltage passes through zero at 'f' and terminates at 'g' on the current waveform. The third reverse power region from 'j' to 'k' begins the repeat of the cycle. The auxiliary current sources that provide the current in the reverse power regions represent relatively small amounts of average power since the voltage at the beginning of the period is zero when the phase current is typically 50% of peak value, and the current falls to zero at 'g' as the voltage reaches typically 50% of peak value.

Figure 14:
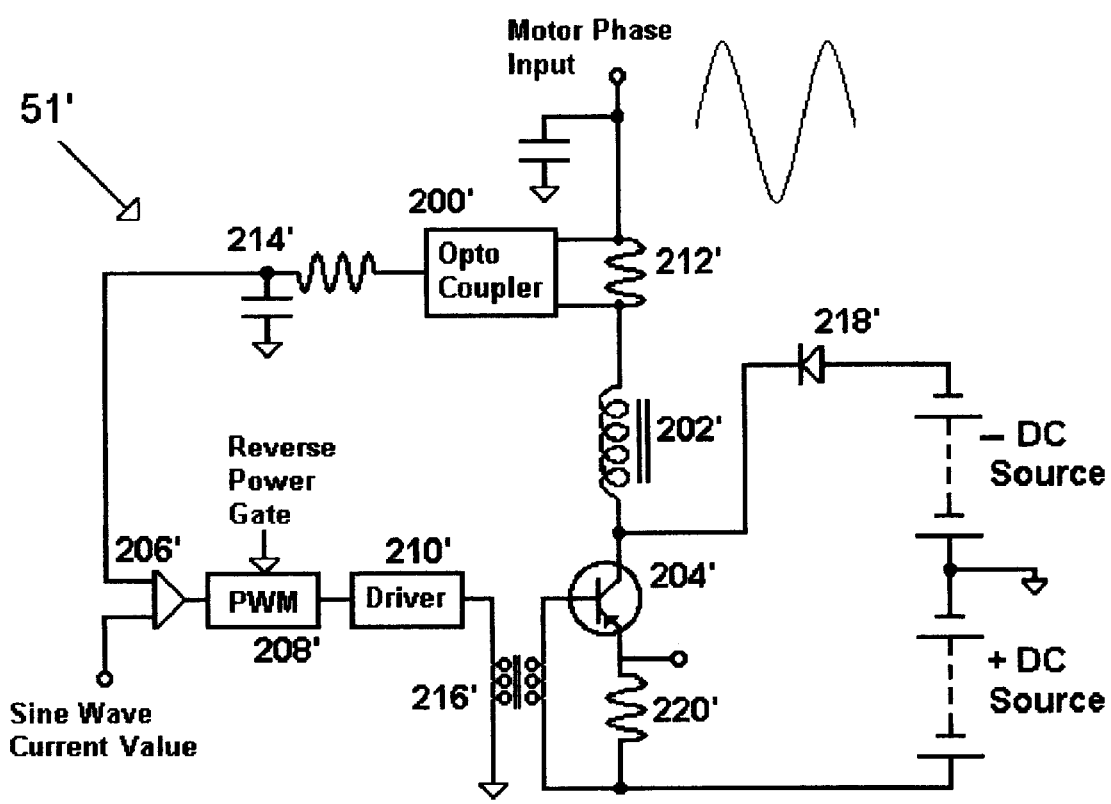
FIG. 14 is a circuit diagram of the second reverse power control of the present invention.

Although the motor impedance varies over a wide range as a function of motor speed and the load on the polyphase variable output alternating current motor 12, the reactance remains inductive throughout the operating power cycle. The sine wave current signal 59 for each phase is maintained by the feedback controlled reverse power controls 51/51' shown in FIGS. 13 and 14. FIG. 13 shows a reverse power circuit as the voltage goes positive for the first and third reverse power regions; while, FIG.14 shows a reverse power circuit as the voltage goes negative for the second reverse power region. For example, when the voltage goes through zero at 'f', the instantaneous value of the current being supplied from the current source inverter is 'e'. Since the power modulators or series resonant inverters 49 can only supply power to the polyphase variable output alternating current motor 12 when the voltage and currents are in the same polarity, this current is then provided by the reverse power control circuits. Although it would possible to absorb the reverse power resistively or in power FETs in relatively simple circuits, the reverse power control 51 and 51' shown in FIGS. 13 and 14 provide a higher system efficiency by returning the power to the DC power source when operating in the reverse power regions.

As shown in FIG. 13, the first reverse power control 51 comprises an opto coupler 200, a chopper inductor 202, a power transistor 204, a comparator 206, a pulse-width modulator 208 and a driver 210. The reverse power is fed through a resistor 212 when the reverse power gate for gate control stage 116 enables the pulse-width modulator 208. The comparator 206 compares the reverse power signal fed from the opto coupler 200 through a resistor/capacitor 214 combination and a sine wave current value or level from the IGBT gate control stage 116. The driver 210 is coupled to the base of the power transistor 204 by a transformer 216; while, the power transistor 204 is coupled to the DC power source by a diode 218 and a resistor 220. The reverse power control 51 operates in reverse power regions 1 and 3.

The second reverse power control 51' operates in the second reverse power region 2 similarly to the first reverse power control 51 except that the current is positive and the voltage is negative. Specifically, as shown in FIG. 14, the second reverse power control 51' comprises an opto coupler 200', a chopper inductor 202'. a power transistor 204', a comparator 206', a pulse-width modulator 208' and a driver 210'. The reverse power is fed through a resistor 212' when the reverse power gate for IGBT gate control stage 116 enables the pulse-width modulator 208'. The comparator 206' compares the reverse power signal fed from the opto coupler 200' through a resistor/capacitor 214' combination and a sine wave current value or level from the IGBT gate control stage 116. The driver 210' is coupled to the base of the power transistor 204' by a transformer 216'; while, the power transistor 204' is coupled to the DC power source by a diode 218' and a resistor 220'.

The reverse power circuits of FIGS. 13 and 14 operate as conventional flyback circuits where energy is first stored in the inductors 202 and 202' during the respective 'on' time and then released to the load at 'turn-off'. Applying feedback sensing from the output to control the transistor's base-drive pulse duration achieves a sinusoidal current waveform in the reserve power regions.

Figure 15:
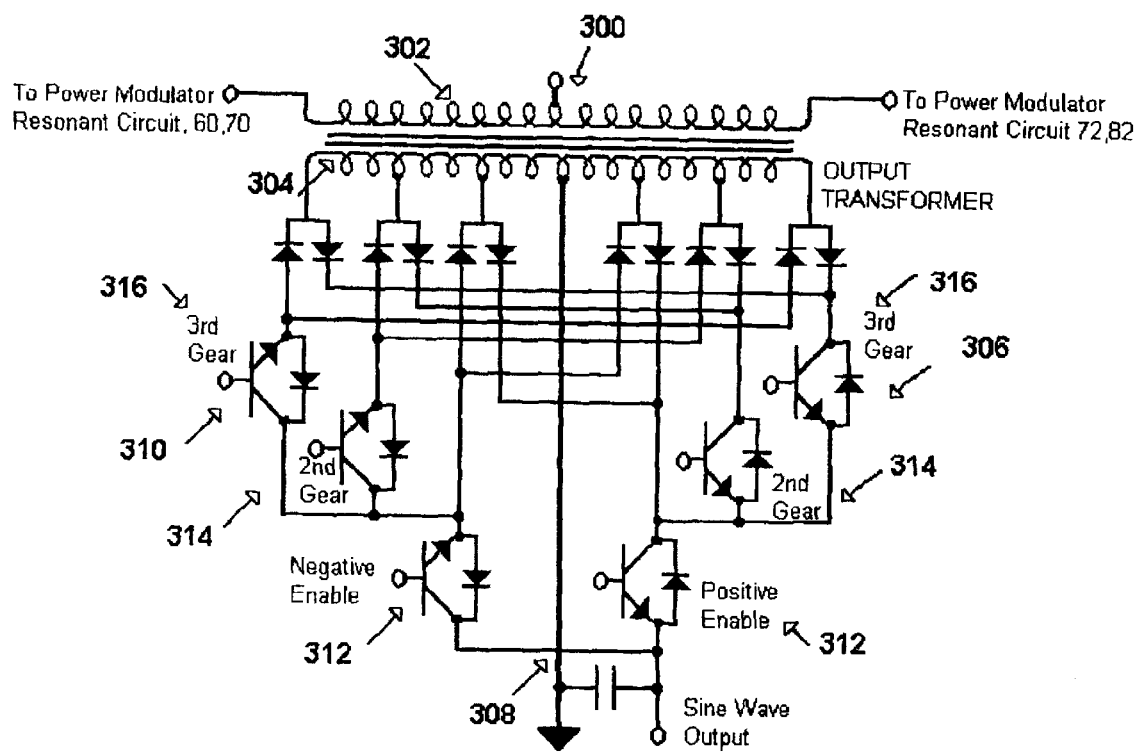
FIG. 15 is a circuit diagram of the electronic gearbox of the present invention.

The variable output induction motor drive system 10 may further include an electronic gearbox. In particular, as shown in FIG. 15, the current packet technology allows the use of tapped windings in an output high frequency transformer generally indicated as 300. A transformer 300 replaces the transformer 84 and the IGBT switches 102 and 104 in the transformer output circuit 46 are replaced by IGBT switches 310 and 306 to enable the sine wave output power to be selectively generated at different levels of voltage or current. Transformer 300 comprises a primary winding generally indicated as 302 and a tapped secondary winding generally indicated as 304 having a multiple tap positive rectified DC output section generally indicated as 306, a center output terminal 308 and a multiple tap negative rectified negative rectified DC output section generally indicated as 310. The multiple tap positive rectified DC output section 306 and the multiple tap negative rectified DC output section 310 each comprises a first, second and third tap generally indicated as 312, 314 and 316 respectively. Corresponding first second and third taps 312, 314 and 316 of the multiple tap positive rectified DC output 306 and the multiple tap negative rectified DC output section 310 cooperatively form a first, second and third electronic gear respectively. The system control 24 includes logic to select the gears or taps 312, 314 or 316 on the transformer 300 to effect an 'electronic gearbox' and match the outputs of the power control generators 36 to variations in motor impedance which occur in the polyphase variable output alternating current motor 12 under different rotor speed and load conditions. For instance, by halving the step-down ratio, twice the nominal value of output current can be supplied to the polyphase variable output alternating current motor 12 at half the nominal voltage. This is an advantage at slow speeds when higher torque is required and the input voltage is lower. Similarly, higher values of output voltage are available for application at high speeds thereby extending the useful high speed operating range of the polyphase variable output alternating current motor 12 without the need for operating with flux weakening.

As previously noted, the output torque of the polyphase variable output alternating current motor 12 is a function of both the rotor current, coupled through the stator, and the rotor slip. Thus, the capability to independently control of the rotor current and the rotor slip provides significantly improved system control not usually available in existing variable speed motor drive systems.

To operate as a sine wave current source at a fixed but settable absolute slip frequency, an accurate and reliable tachometer to measure the rotor speed (frequency) is important. The tachometer can be a mechanical type tachometer to sense or measure the output shaft rotating speed or an electronic tachometer capable of calculating the output rotor speed from the input excitation parameters.

Figure 16:
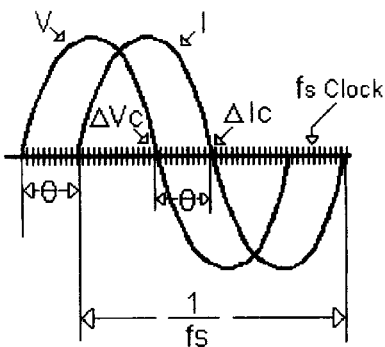
FIG. 16 depicts stator voltage and current waveforms with respect to time.

As shown in FIG. 16, the stator voltage and lagging current waveforms may be divided into equal increments of time such as the 256 times intervals by an $f_s$ clock. The $f_{s'}$ clock is locked in frequency to $f_s$ such that $f_{s'}$ clock=256 $f_s$.

Because the frequency of $f_s$ clock is equal to 256 times the $f_s$, each clock pulse interval of $f_{s'}$ clock is equal to $360°/256$ or 1.406 degrees. Accordingly, if 360° is equal to 256 pulses, then 30° would equal $30°/360° \times 256 \approx 21$ pulses. Thus, by counting the clock pulses between $\Delta V_c$, and $\Delta I_c$, (i.e. when the voltage and current waveforms cross the zero axis) $\ominus$ can be determined. If $\ominus$ and $f_s$ are known, then the motor frequency $f_R$ can be calculated as $\tan \ominus = 2\pi |_r \Delta f / r_{20} + r_s \Delta f / f_s$.

Figure 17:
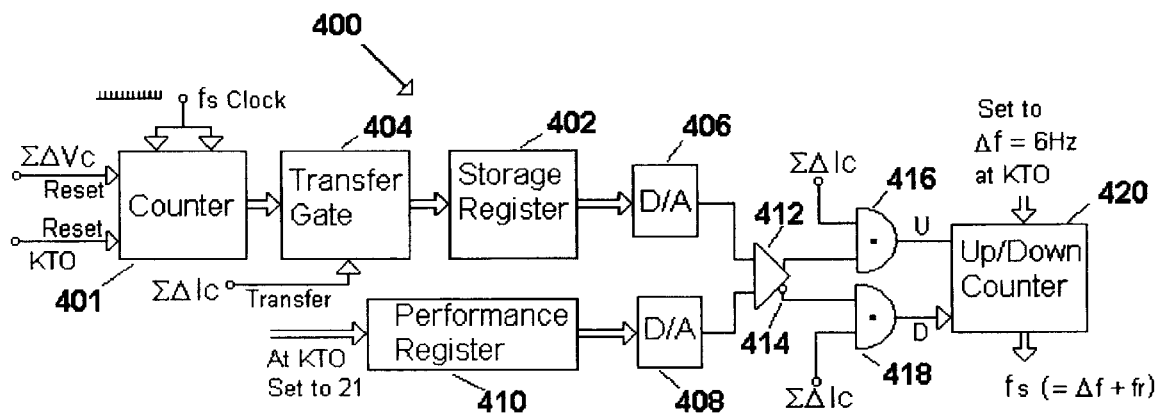
FIG. 17 is a block diagram of the electronic tachometer of the present invention.

FIG. 17 is a schematic diagram of an electronic tachometer 400 comprising a counter 401 coupled to a storage register 402 through a transfer gate 404, a first and second digital to analog convertor indicated as 406 and 408 respectively coupled to the storage register 402 and a performance register 410 respectively, a comparator 412 with an inverter 414 coupled to output the first and second digital to analog converters 406 and 408, a first and second gate 416 and 418 coupled between the comparator 412 with the inverter 414 and an up/down counter 420.

At start-up or when the key is turned on (KTO), the counter 401 is reset, the register 410 is set to a predetermined value or count such as 21, the up/down counter 420 is set to a predetermined value such as 6 Hertz and the register 402 is set to zero.

Counter 401 counts the $f_s$ clock pulses, reset at each $\Delta V_c$ (sum of $\Delta V_c$ from all the phases) and transfers the count to the storage register 402 at each $\Delta I_c$, (sum of all three phases). Accordingly, the count between $\Delta V_c$ and $\Delta I_c$ in storage the register 402 represents the latest value of $\theta$ (updated six times per cycle of $f_s$). The measured or actual value of $\theta$ in 402 is compared to the predetermined value of $\theta$ in performance register 410. The summation of the running values (both positive and negative) is contained in the up/down counter 420. Thus, the digital number in up/down counter 420 represents the predetermined value for $f_s$. This is because the up/down counter 420 is set to an initial value of $\Delta f$ (for example 6 Hz) and at start up $f_R$ is (by definition) equal to zero. As $f_R$ starts to increase, $f_s$ must also increase to keep $\theta$ from changing or becoming smaller. In other words, when $f_R$ increases, $\theta$ decreases so an UP pulse is added to up/down counter 420 to increase $f_s$ which, in turn, maintains $\theta$ at the predetermined value such as 6 Hertz.

By summing the errors both + and − of the comparison of $\theta$ (t) and $\theta_{set}$ up/down counter 420 maintains a running count which maintains $f_s$ always $\Delta f$ higher than $f_R$.

This controlled slip frequency implementation of the control strategies and formats represent a new and different method of controlling induction motors in many applications. Operation with current source excitation at controllable constant slip frequency allows control of both speed at a given torque and torque at a given speed to be controlled by a change in stator input current alone.

The fixed or constant slip operation allows faster and more precise speed and torque response, enhanced torque per unit input current and exclusion of torque breakdown when operating at maximum slip.

The current source implementation allows enhanced torque at both high and low speeds and improved stability and performance, especially available torque at low speeds.

The sinusoidal excitation affords the polyphase variable output alternating current motor 12 improved bearing life, enhanced insulation life, greatly reduced EMI and the use of longer connecting cable between the power source and the motor.

The electronic gear box provides performance that is equivalent 2 pole, 4 pole and 8 pole motor operation, enhancing performance over the torque and speed ranges with improved control over the precision and stability of the polyphase variable output alternating current motor 12.

As previously indicated, the output torque of the polyphase variable output alternating current motor 12 is a function of both the stator current and the rotor slip. As described more fully hereinafter, the ability to independently control the stator current and the rotor slip provides system control functions not commonly present in available variable speed drive systems. Controlling the rotor slip of a polyphase variable output alternating current motor 12 offers an advantage of operating an induction motor at the optimum slip conditions of the particular polyphase variable output alternating current motor 12. Once the control characteristics of the polyphase variable output alternating current motor 12 are established, a single optimized value of the rotor slip can be established for use throughout the speed range.

Figure 18:
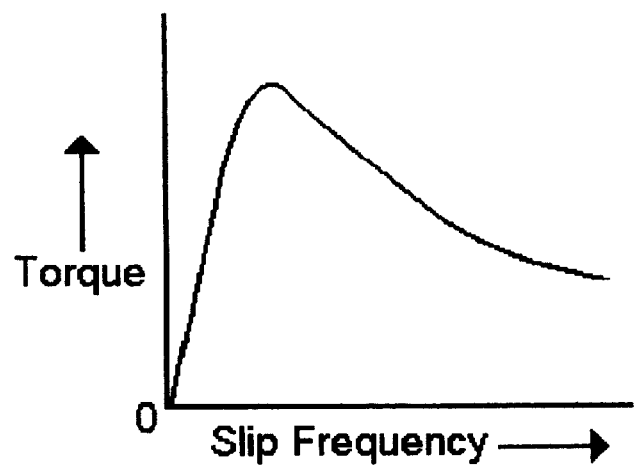
FIG. 18 depicts a torque versus slip frequency curve for an induction motor.
Figure 19:
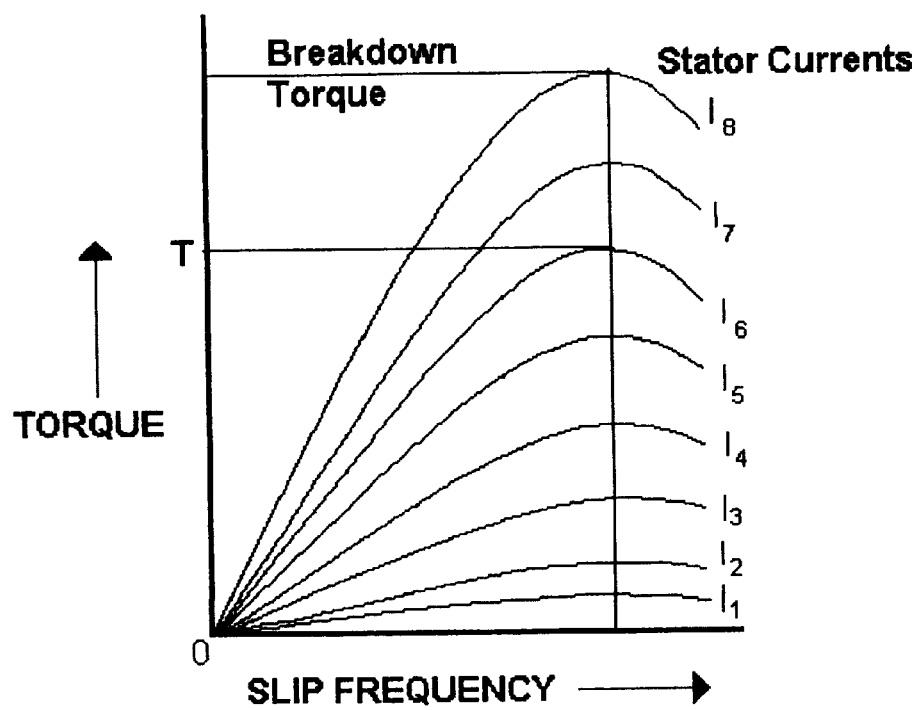
FIG. 19 depicts a family of torque versus slip frequency curves for an induction motor.

The operating relationship between stator current, rotor slip and output torque is illustrated in FIGS. 18 and 19. In particular, the torque/slip frequency characteristics depicted in FIG. 18 shows torque as a function of the slip frequency. Since the variable output induction motor drive system 10 provides a controllable current to the stator, control of torque is simple and direct. FIG. 19 depicts a family of torque/slip frequency curves showing that slip frequency can be increased and the stator current reduced or the slip frequency reduced and the stator current increased in order to operate at a given torque T on the torque axis. Accordingly, it can be seen that the torque produced in the polyphase variable output alternating current motor 12 can be controlled by changing the stator current or changing the slip. Finally, by operating at a slip that gives the peak torque, the current can be minimized to provide peak design motor efficiency.

The frequency $f_s$ of each variable sine wave generator 39 is controlled by the rotor speed with a controlled slip frequency Δf added. The frequency of the stator currents is therefore always a predetermined amount of slip 1f more than the rotor speed.

Figure 20:
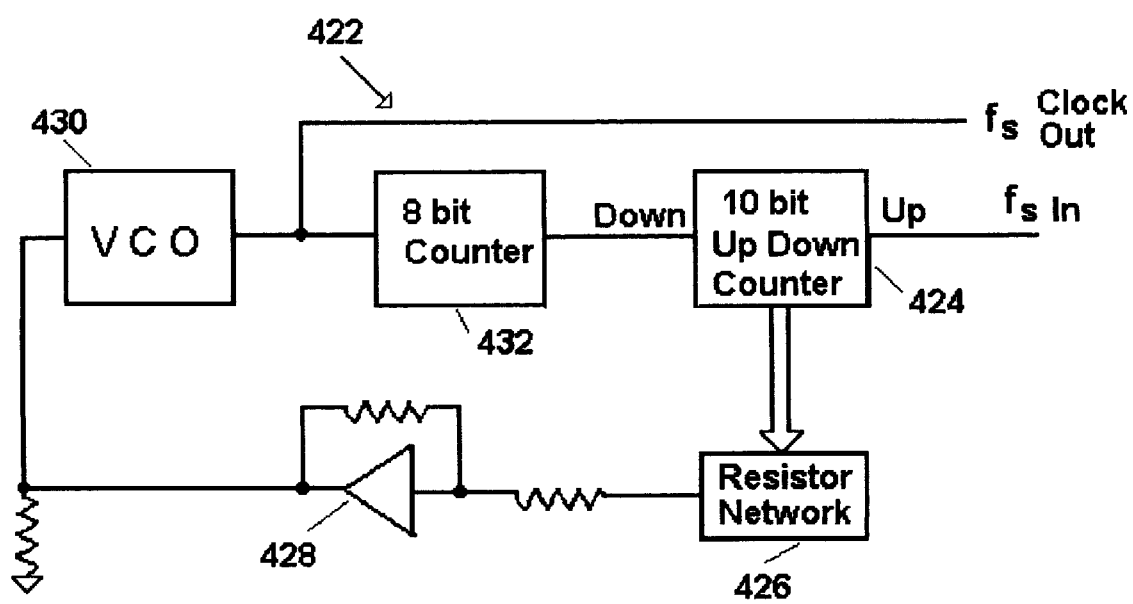
FIG. 20 is a block diagram of a frequency multiplier for generating high frequency clock pulses locked to the input stator frequency.
Figure 21:
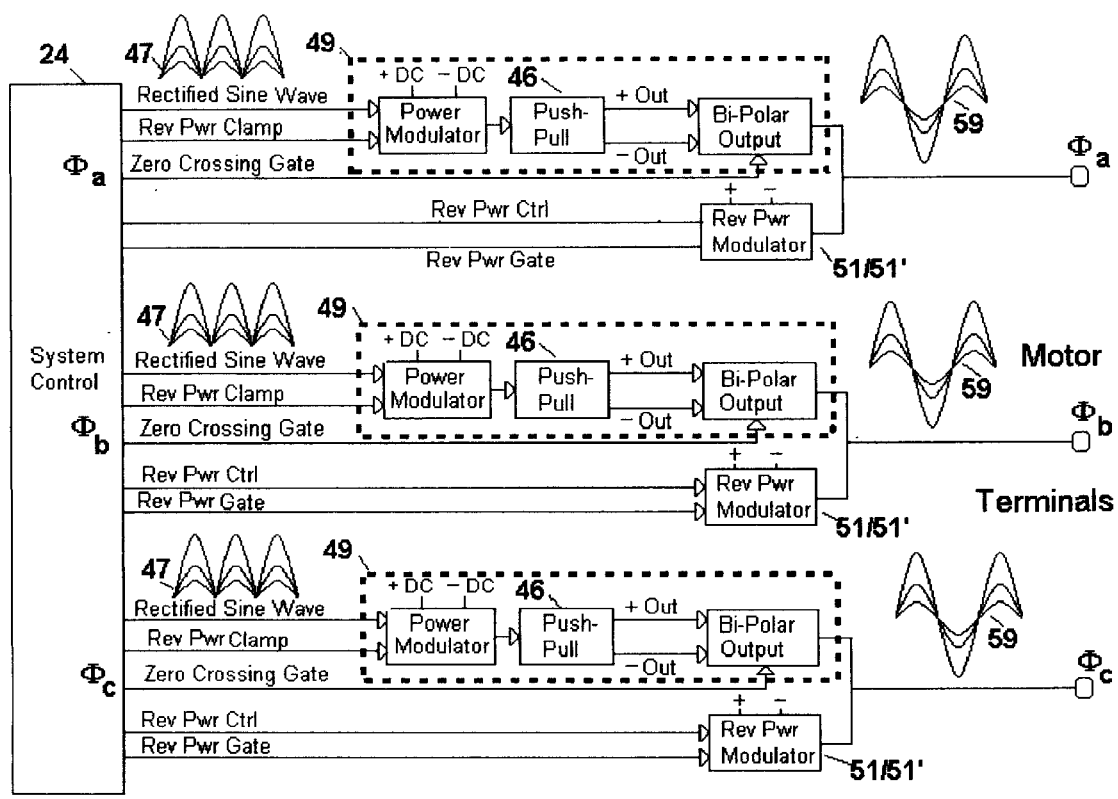
FIG. 21 is a block diagram of a power control generator of the present invention with an alternative reverse power control.

The frequency multiplier 422 shown in FIG. 20 generates a frequency $f_s$ clock substantially equal to 256 times the stator excitation frequency $f_s$. The $f_s$ clock is used for timing in the control system 24 and in the electronic tachometer 400 of FIG. 17.

At start-up (KTO), an up/down counter 424 is reset to zero. The stator excitation frequency $f_s$ is fed to the 'up' side of the up/down counter 424 to increment the count. The output voltage of a resistor network 426 is amplified by an amplifier generally indicated as 428 to control the output frequency $f_s$ clock from a variable frequency oscillator (VCO) 430. The $f_s$ clock is also coupled to an 8 bit counter 432 that divides the $f_s$ clock frequency by 256. This 1/256×$f_s$ clock signal from the 8 bit counter is fed to the 'down' side of up/down counter 424 so that the up/down counter 424 continuously compares the frequency of $f_s$ and $f_s$ clock divided by 256 to generate an error signal. The negative feedback loop consisting of components 424 through 432, connected as shown in FIG. 20, functions to stabilize (lock) the value of $f_s$ clock to be equal to 256 times the frequency of $f_s$.

To generate continuous sinusoidal waveforms for use with the polyphase variable output alternating current motor 12, the variable output induction motor drive system operates effectively with both forward power when the phase voltage and current are the same polarity and reverse power when the phase voltage and current are of opposite polarity. This is accomplished by the power modulators 36 and corresponding reverse power controls 51/51' that generate the phase current flow at the proper time intervals.

Figure 23:
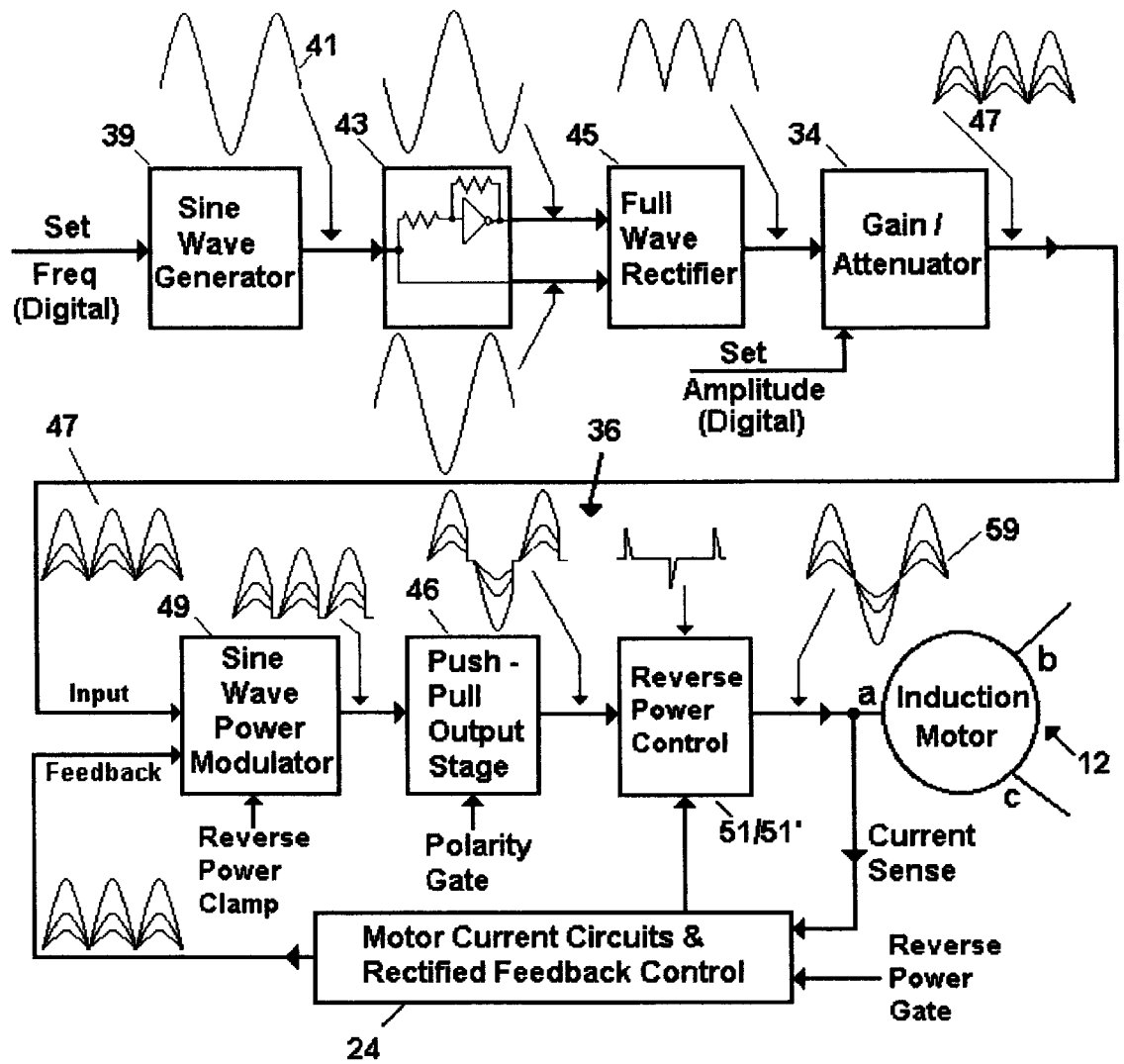
FIG. 23 is a block diagram of the present invention defining the various waveforms generated thereby.
Figure 24:
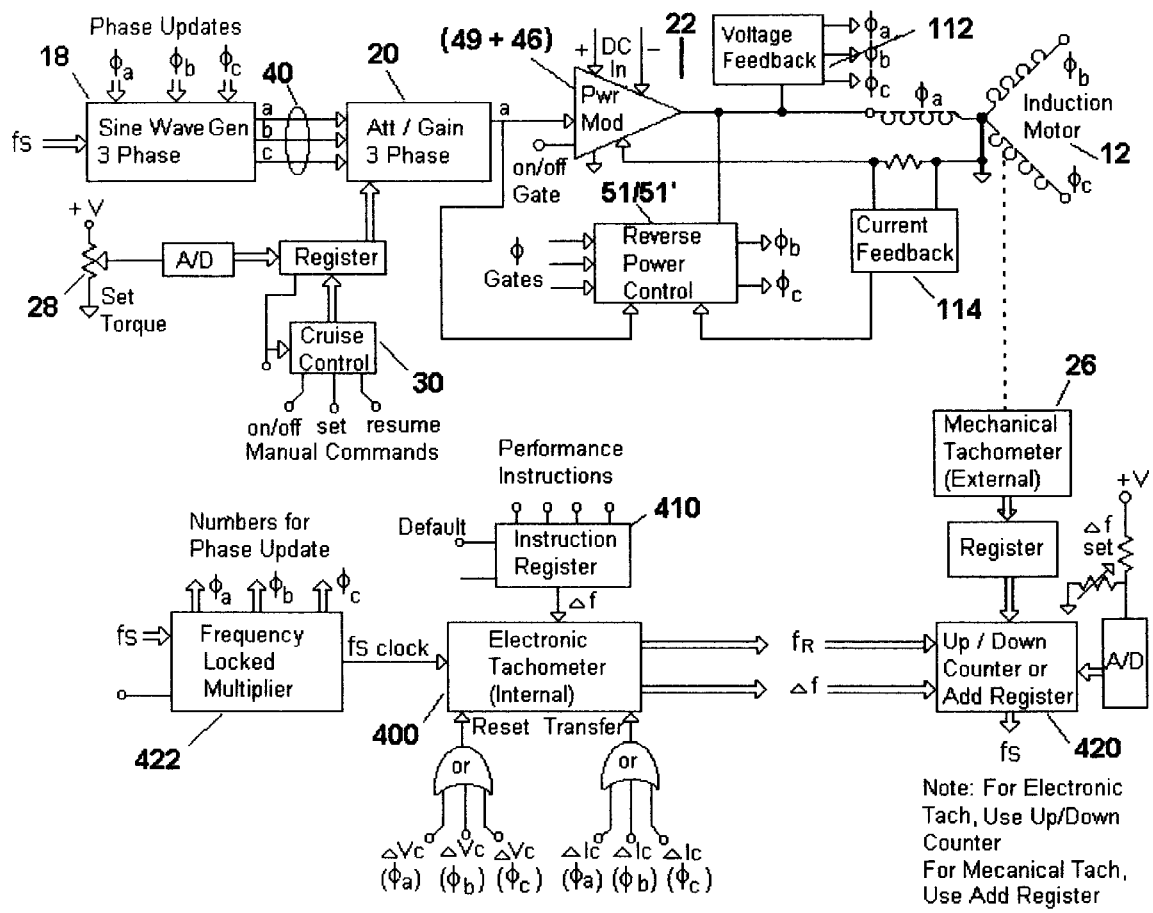
FIG. 24 is a block diagram of the variable output induction motor drive system.
Figure 25:
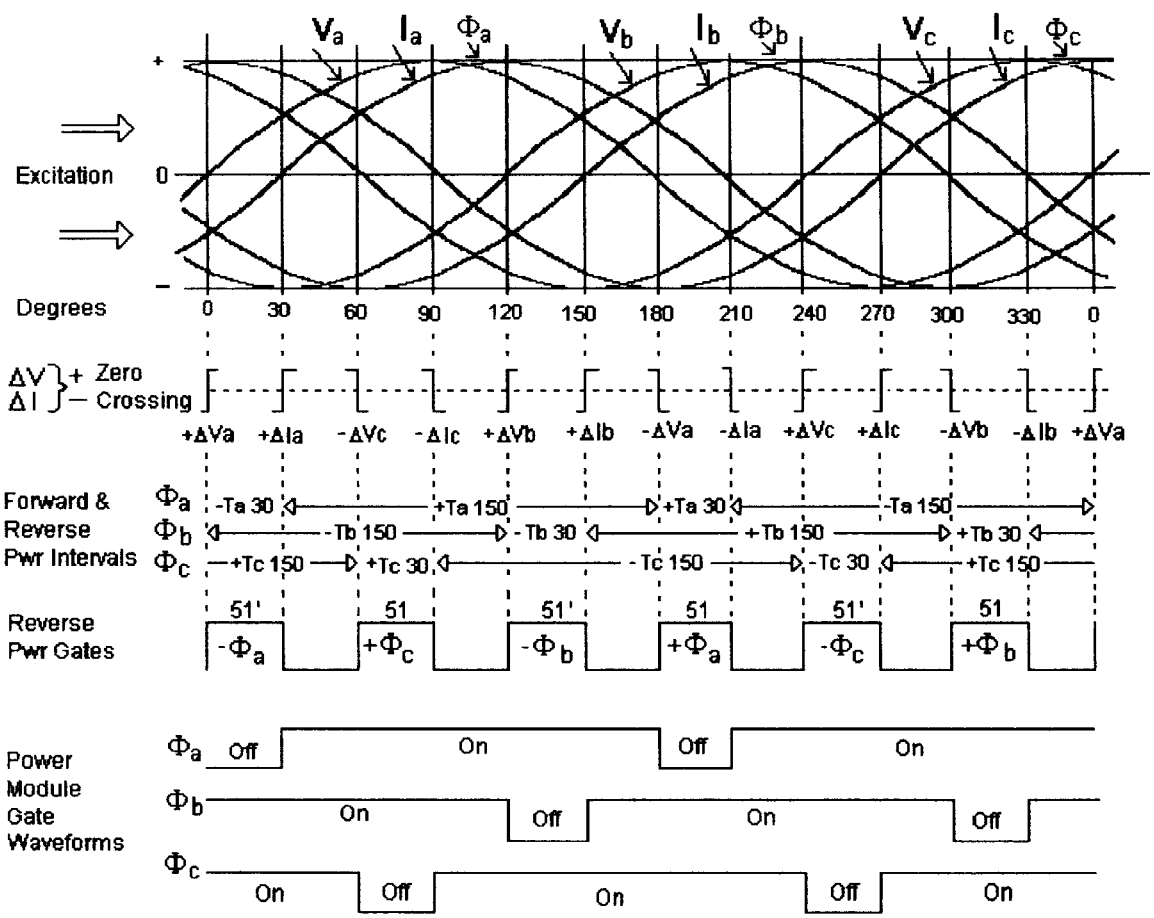
FIG. 25 illustrates the three phase control and timing waveforms, the gating of the three phase power modulators and the gating of the reverse power controls.

Referring to FIGS. 21, 23 through 25 and 27, the power modulators 36 and corresponding reverse power controls 51/51' are gated on/off by a power modulator gate control 21-1 and gates 21-2 connect the reverse power generator 51/51' to the proper phase at the proper time. The gating patterns and the timing for gating each of the three phases a, b, c are shown in FIG. 25. The gating patterns for the forward and reverse power intervals effectively combine the forward power quasi sinusoids supplied from AC power output stage 49 with the corresponding reverse power components supplied from the corresponding reverse power control 51/51' to generate the sinusoids 59 at the terminals of the polyphase variable output alternating current motor 12 as shown in FIG. 23.

Figure 22:
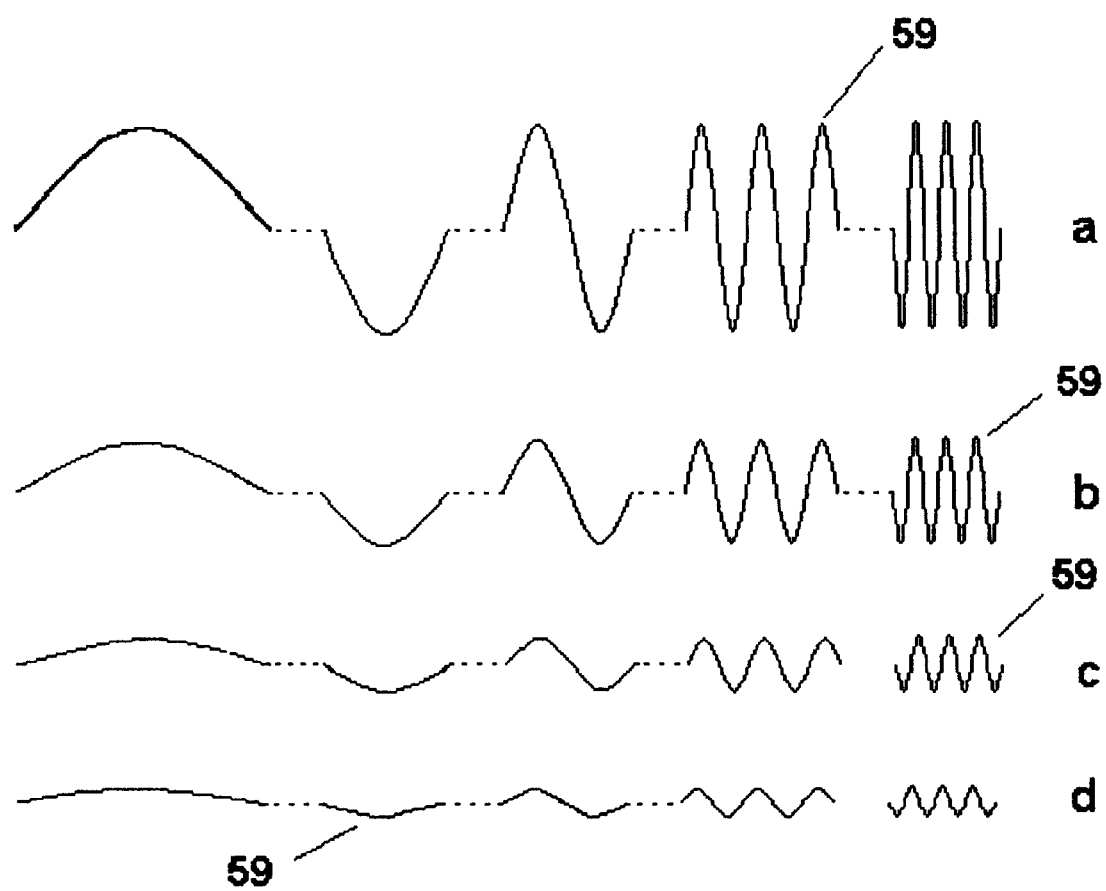
FIG. 22 illustrates frequency and amplitude modulation waveforms applied from the amplitude control generators to the corresponding power control generators of the present invention.

It is well known that the speed control of an induction motor under variable loads requires that each phase of the sinusoidal motor current must be controlled in both frequency and amplitude. In FIG. 22, waveform 'd' shows the excitation or variable sine wave current 59 required for a lightly loaded motor (small amplitude waveform) varying in speed (frequency) from a low rate (left side) to a higher speed. As the load is increased, higher amplitudes of current are required, as shown in the waveforms from 'd' to 'a'. The variable amplitude variable frequency sinusoidal waveforms 59 shown in FIG. 22 for each phase of a three-phase motor are generated by the variable output induction motor drive system 10 as best shown in FIGS. 23 and 24.

Figure 7:
FIG. 7 depicts a gating signal applied to each power modulator to generate the sine waveform of each power modulator of the present invention.
Figure 8:
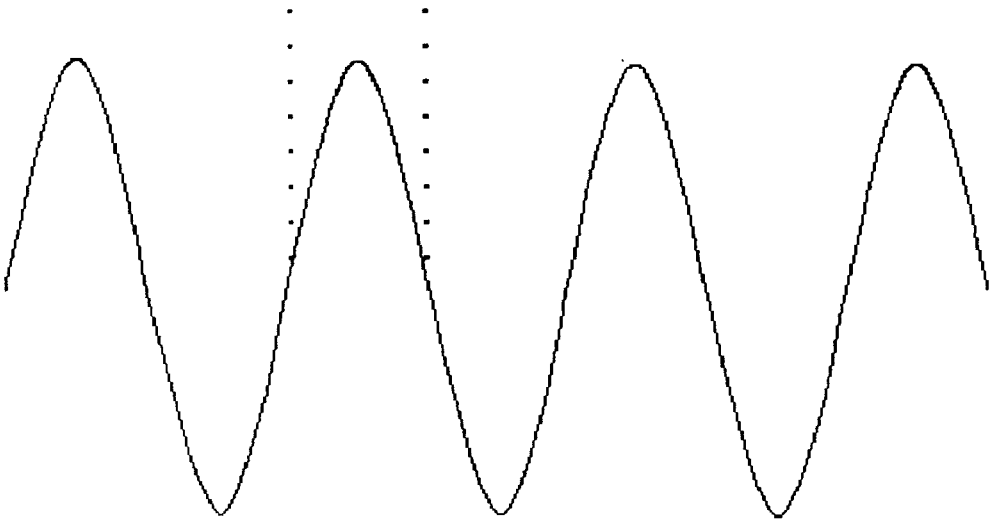
FIG. 8 depicts the sine wave current generated by each power control generator of the present invention applied to each phase of the polyphase variable input alternating current motor.

The functional blocks shown in FIG. 23 can be correlated with the functional blocks shown in FIGS. 3 and 4. The frequency control generator 32 comprising a sine wave generator section 39 and corresponding rectifier section 43 generates sine waves at constant amplitude at the desired frequency that is rectified 45 and fed to the amplitude control generator 34. The output of amplitude control generator 34 is a constant frequency, variable amplitude, and rectified sinusoidal waveform 47 fed to the sine wave power modulator 49 of the power control generator 36. The output of power modulator 49 is a variable, high power unity polarity sinusoidal current that is gated off by the reverse power clamp signal. The signal shuts off the power modulator 49 during reverse power period when the corresponding reverse power control 51/51' supplies the reverse current because the power modulator 49 can not absorb reverse power. Rectified input signals are used because the power modulator 49 can only accept input signals of one polarity. Bipolar high power sinusoidal current drive waveforms are reconstructed by combining the push-pull inputs from the AC power output stage 46 at the zero crossing points in the wave form as shown in FIGS. 7, 8 and 9. The output from the push-pull stage 46 is the variable power (variable amplitude), variable frequency, quasi sinusoidal waveform that, when combined with bipolar (small) pieces supplied by the reverse power control 51/51' supplies the continuous sinusoidal waveform 59 required by each phase a, b, c of the polyphase variable output alternating current motor 12.

The motor excitation frequency and amplitude as well as the on/off gating (timing) are controlled by the system control 24 which supplies feedback signals of the motor phase current to be compared with the predetermined input to ensure that the motor current is a verified sinusoid at the desired frequency and amplitude, independent of the motor impedance.

FIG. 24 shows the basic functions of the control system 16. Specifically, at start-up (key turn-on, KTO), the induction motor 12 is at rest ($f_R=\theta$) and $f_s$ is set to the optimum slip designated frequency (e.g. 6 Hz) by up/down counter 420. The three-phase frequency 40 output of the frequency control stage 18 is given maximum attenuation by the corresponding amplifier control stage 20 so that essentially zero current is initially supplied to the polyphase variable output alternating current motor 12. During this initialization period (typically a few milliseconds), the frequency locked multiplier 422 causes the three-phase sine wave generators 18 to output a 6 Hz, three-phase signal (a, b, c). Meanwhile, the electronic tachometer 400 supply feedback signals to the up/down counter 420 to maintain $f_s$ at the desired stator start-up frequency (6 Hz); this value being determined (set) by the performance or instruction register 410. With the motor at rest ($f_R=\theta$), an increase in power (current) is applied to the stator windings by the power control stage 22 in response to control signals from first torque control input device 28 or second torque control input device 30, which in turn, causes the instruction register 410 to reduce the attenuation of the amplitude control stage 20, thus causing increased current in the stator windings of the polyphase variable output alternating current motor 12. When the motor rotor starts to turn, the rotor speed (frequency) is sensed by either a mechanical tachometer 26 or the electronic tachometer 400 to cause the stator frequency $f_s$, to increase such that $f_s$ is always equal to the rotor frequency plus the designated optimum slip frequency $\Delta f$.

During each cycle of the three-phase excitation frequency $f_s$, the power modulators 49 and corresponding reverse power controls 51/51' combine to deliver the proper sinusoidal excitation of each phase a, b, c of the polyphase variable output alternating current motor 12. The timing and gating wave shapes of the various control signals indicated in FIG. 24 are shown in FIG. 25.

The three-phase excitation stator current waveforms 59 ($\Phi a$, $\Phi b$ and $\Phi c$) are shown in the upper portion of FIG. 25 with the respective three-phase leading terminal voltages. Below the stator currents and voltages is shown the timing (in degrees) referenced to $\Phi a$ voltage waveform. Also shown are the various voltage and current zero crossings for phase a ($\Phi a$), phase b ($\Phi b$), and phase c ($\Phi c$).

Below the zero crossings are the time intervals for the forward power flow from the power modulator 20 and the reverse power flow for each of the three phases ($-T_{30}$, $+T_{150}$, $T_{30}$, $-T_{150}$) for each phase. The waveform patterns shown at the bottom of FIG. 25 are based on, and consistent with the timing intervals $\pm T_{30}$ and $\pm T_{150}$ associated with each of the sinusoidal excitations of $\Phi a$, $\Phi b$ and $\Phi c$. The gating signals shown are used to control both the reverse power (RP) supplied by the reverse power controls 51/51' during time intervals $+T_{30}$ and $-T_{30}$ and the forward power supplied by the power modulator 22 during the time intervals $+T_{150}$ and $-T_{150}$ of each phase. A study of the interconnections of the functional blocks of FIG. 24 together with the wave shapes in FIG. 25 will facilitate the understanding of the various control functions required for this invention.

Figure 26:
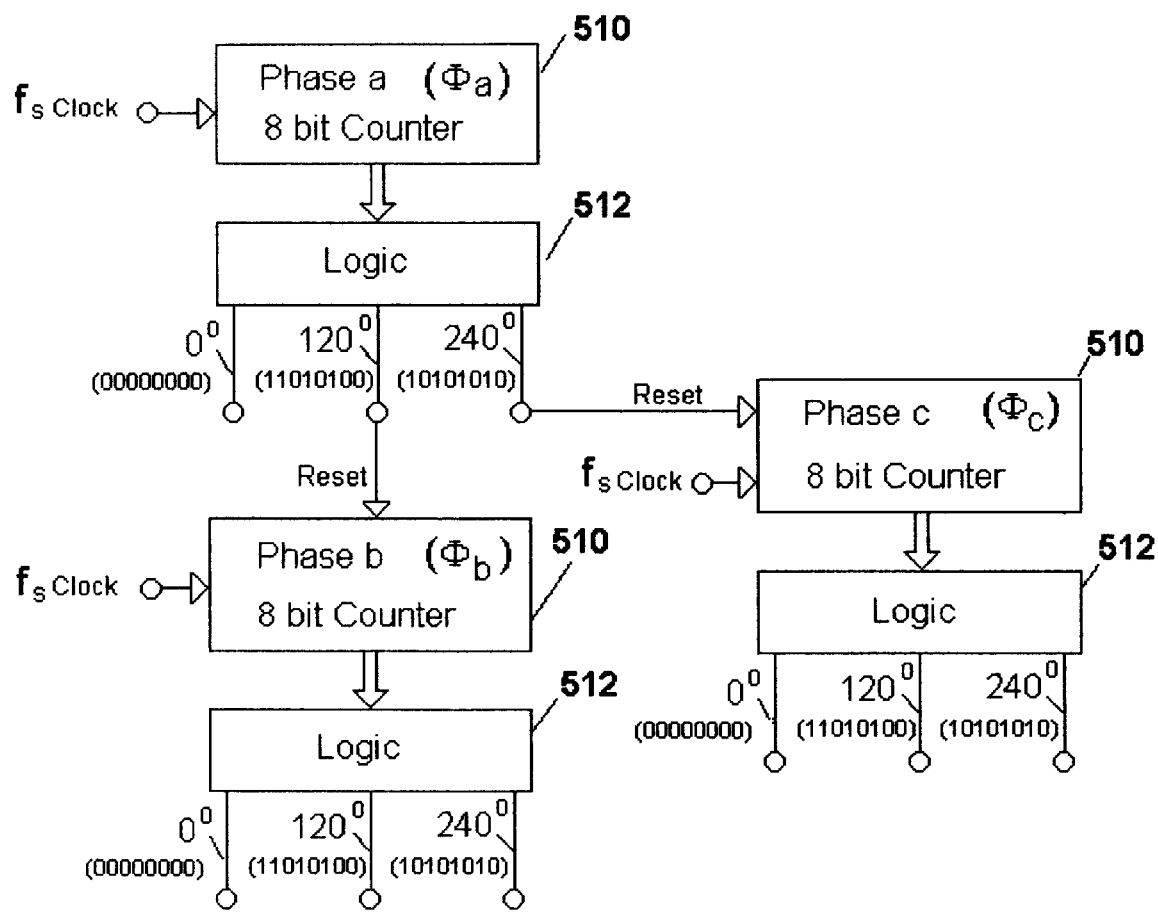
FIG. 26 is a block diagram of a multi-frequency synchronization circuit of the present invention.
Figure 27:
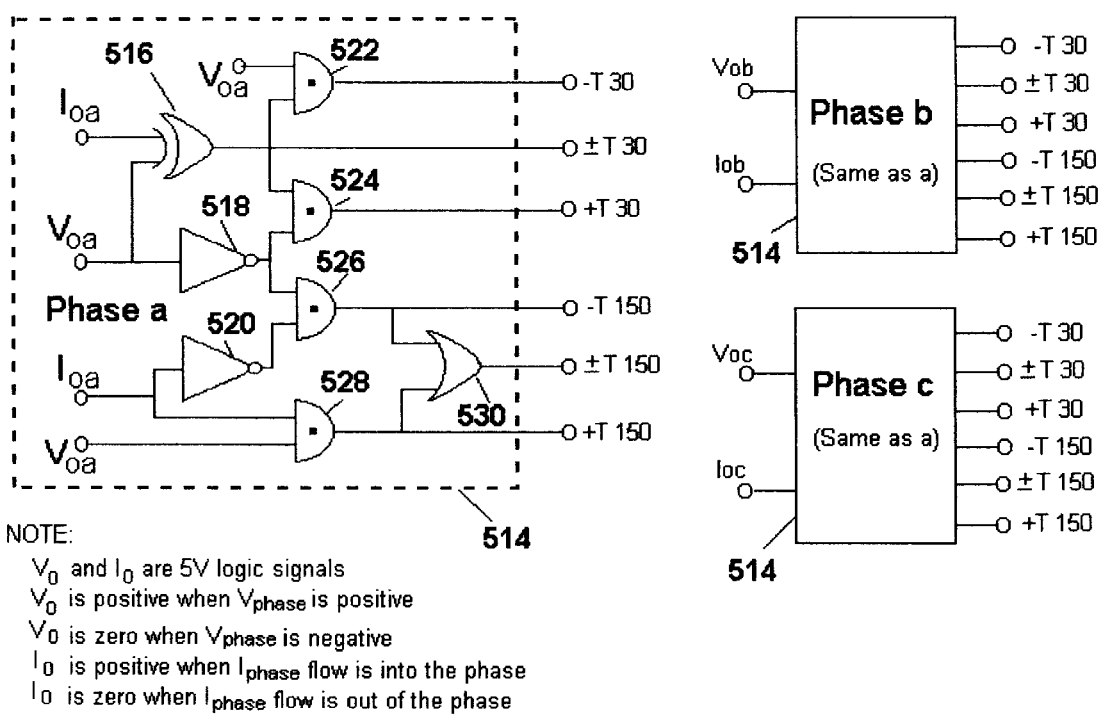
FIG. 27 is a timing and gating circuit to generate gating pulses for the power modulators and reverse power controls of the present invention.

Implementation of the variable output induction motor drive system 10 is shown in FIG. 3 and more fully depicted in FIGS. 24 and 25, may be accomplished using a microprocessor or with standard digital logic using individual digital signal processing integrated circuits as shown in FIGS. 26 and 27. As shown in FIG. 26, the digital logic components may comprise three 8 bit counters each indicated as 510 with corresponding logic and gates each indiated as 512 to define the 0, 120, 180 and 270 degree markers of each of the variable frequency, variable amplitude three-phase sinusoidal excitations. Each 8 bit counter 510 uses he same $f_s$ clock input, then when the $\Phi a$ is used as a system reference when the 120 degree marker and 240 degree marker is used to reset the $\Phi b$ counter and $\Phi c$ counter respectively, all three phases are locked in frequency and in proper phase relationship. FIG. 27 discloses an interval timing logic circuit 514, for each phase a, b, c the $V_o$ (phase voltage) signal in combination with the $I_o$ (phase current signal) to generate signals for $+T_{150}$, $-T_{150}$, $\pm T_{150}$, $+T_{30}$, $-T_{30}$, and $\pm T_{30}$ that are used to control both the power modulators 49 (during forward power intervals) and corresponding reverse power controls 51/51' (during reverse power intervals). The internal timing logic circuit 514 comprises a gate 516, a first and second amplifier 518 and 526 respectively, a first, second, third and fourth gate 522, 524, 526 and 528 respectively, and a output gate 530.

In summary, there are several significant differences between the variable speed drive system of the present invention and prior art PWM systems. Instead of using pulse-width modulation to synthesize sine wave voltages as depicted in FIG. 2, production of true sine wave currents require a power modulator capable of generating sine wave currents over a range from a few Hertz to more than 200 Hz with high conversion efficiency. The power source must also be capable of providing sine wave current in four quadrants to satisfy the lagging power factor of the motor 12. The power modulators or resonant series inverters 49 combined with the corresponding reverse power controls 51/51' are capable of driving output loads which can vary from a short circuit to high impedance, with power factors from about 0.75 to about 1.0.

Another difference is in the manner in which the frequency of the sinusoidal current source excitation for the stator windings is derived. Instead of the usual "constant volts per Hertz amp" used in PWM systems; the present invention constrains or sets the stator excitation frequency to a selectable control value above the rotor frequency (speed). This causes the motor 12 to operate at constant slip that allows increase output torque per unit current of excitation.

Yet another difference from the PWM systems is that the present invention uses a dual resonant circuit current packet implementation operating at high carrier frequency, which, unlike PWM, allows the use of transformer coupling to give ohmic isolation and optimum matching between the power source and the load at all speeds i.e. gear shifting.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall there between.

Now that the invention has been described.

What is claimed is:

1. A variable output induction motor drive system for use with a polyphase variable output alternating current motor including a rotor and stator to drive an operating load, said variable output induction motor drive system comprises a sine wave current generator operatively coupled to a direct current power source to receive direct current therefrom and to generate a variable frequency, variable amplitude sine wave current and operatively coupled to the polyphase variable output alternating current motor to selectively feed the variable frequency, variable amplitude sine wave current thereto and a sine wave power control coupled between said sine wave current generator and the polyphase variable output alternating current motor to monitor the operating parameters of the polyphase variable output alternating current motor and to control the amplitude and frequency of the variable frequency, variable amplitude sine wave current fed from said sine wave current generator to the polyphase variable output alternating current motor to control the output torque and speed thereof, said sine wave current generator comprises a frequency control stage, an amplitude control stage and a power control stage; said frequency control stage comprising a plurality of frequency control generators to generate a constant amplitude, variable frequency rectified signal corresponding to each of phases of the polyphase variable output alternating current motor; said amplitude control stage coupled to said frequency control stage comprising a plurality of amplitude control generators to control the amplitude of the constant amplitude, variable frequency rectified signal from the corresponding frequency control generator to generate a variable frequency, variable amplitude control rectified signal and said power control stage comprises a plurality of power control generators coupled to said amplitude control stage to modulate the DC input power from the DC power source with variable frequency and variable amplitude rectified signals from said corresponding amplitude control generators to generate the variable frequency, variable amplitude sine wave current fed to each corresponding phase of the polyphase variable output alternating current motor.

2. The variable output induction motor drive system of claim 1 wherein each said frequency control generator comprises a sine wave generator section to generate a variable frequency sine wave and a rectifier section to rectify said variable frequency sine wave to generate said variable frequency rectified signal fed to said corresponding amplitude control generator of said amplitude control stage.

3. The variable output induction motor drive system of claim 2 wherein each said sine wave generator section generates a sinusoidal waveform having a substantially constant peak to peak amplitude and the output phases of said sine wave current generator are gated by said sine wave power control such that the waveforms of each said sine wave current generator is phase shifted relative to each other.

4. The variable output induction motor drive system of claim 3 wherein the amplitude of the variable frequency rectified signal is increased or decreased by said corresponding amplitude control generator to generate the variable frequency, variable amplitude-rectified signal applied to said corresponding power control generator.

5. The variable output induction motor drive system of claim 2 wherein each power control generator comprises a power modulator to modulate the DC input power from the DC power source with the variable frequency, variable amplitude rectified signal from the corresponding amplitude control generator.

6. The variable output induction motor drive system of claim 5 wherein each said power modulator comprises a pair of series resonant circuits.

7. The variable output induction motor drive system of claim 6 wherein each said power control generator further includes a reverse power control to generate a power signal when the corresponding phase is operating in a reverse power region.

8. The variable output induction motor drive system of claim 5 wherein each said power control generator further includes a reverse power control to generate a power signal when the corresponding phase is operating in a reverse power region.

9. The variable output induction motor drive system of claim 6 wherein each said series resonant circuit comprises a first and second resonant inverter stage operatively coupled to the DC power source thereof, a DC power input stage and the polyphase variable output alternating current motor through an AC power output stage.

10. The variable output induction motor drive system of claim 9 said AC power output stage comprises a positive rectified output terminal and a negative rectified output terminal coupled to a center terminal.

11. The variable output induction motor drive system of claim 10 wherein said output terminals are modulated and gated to produce the variable frequency, variable amplitude sine wave current for each phase of the polyphase variable output alternating current motor from said corresponding power control generator.

12. The variable output induction motor drive system of claim 11 wherein said sine wave power control includes a system feedback means having a voltage reference generator to generate a voltage reference and a current reference generator to generate a current reference to control operation of said variable output induction motor drive system.

13. The variable output induction motor drive system of claim 9 wherein the magnitude of said variable sine wave current is controlled by the relative phase of the currents from said corresponding first and second series resonant inverter stages.

14. The variable output induction motor drive system of claim 13 wherein the output of each said series resonant circuit is combined in said AC power output stage.

15. The variable output induction motor drive system of claim 9 wherein the sinusoidal currents from said first and second resonant inverter stages are combined in a transformer.

16. The variable output induction motor drive system of claim 15 further includes an electronic gearbox to enable the sine wave output power to be selectively generated at different levels of current.

17. The variable output induction motor drive system of claim 16 wherein said transformer comprises a primary winding and a tapped secondary winding having a multiple tap positive rectified DC output section, a center output terminal and a multiple tap negative rectified DC output section.

18. The variable output induction motor drive system of claim 17 wherein said multiple tap positive rectified DC output section and said multiple tap negative rectified DC output section each comprising a first and second tap and corresponding first and second taps of said multiple tap positive rectified DC output and said multiple tap negative rectified DC output section cooperatively form a first and second electronic gear.

19. The variable output induction motor drive system of claim 18 wherein said sine wave power control includes logic to select taps on said transformer to effect an electronic gearbox and match the outputs of said power control generators to variations in motor impedance which occur in the 20. The variable output induction motor drive system of claim 15 further includes an electronic gearbox to enable the sine wave output power to be selectively generated at different levels of voltage.

21. The variable output induction motor drive system of claim 20 wherein said transformer comprises a primary winding and a tapped secondary winding having a multiple tap positive rectified DC output section, a center output terminal and a multiple tap negative rectified DC output section.

22. The variable output induction motor drive system of claim 21 wherein said multiple tap positive rectified DC output section and said multiple tap negative rectified DC output section each comprising a first and second tap and corresponding first and second taps of said multiple tap positive rectified DC output and the multiple tap negative rectified DC output section cooperatively form a first and second electronic gear.

23. The variable output induction motor drive system of claim 22 wherein said sine wave power control includes logic to select taps on said transformer to effect an electronic gearbox and match the outputs of said power control generators to variations in motor impedance which occur in the polyphase variable output alternating current motor under different rotor speed and load conditions.

24. The variable output induction motor drive system of claim 15 further includes an electronic gearbox to enable the sine wave output power to be selectively generated at different levels of voltage and current.

25. The variable output induction motor drive system of claim 24 wherein said transformer comprises a primary winding and a tapped secondary winding having a multiple tap positive rectified DC output section, a center output terminal and a multiple tap negative rectified DC output section.

26. The variable output induction motor drive system of claim 25 wherein said multiple tap positive rectified DC output section and said multiple tap negative rectified DC output section each comprising a first and second tap and corresponding first and second taps of said multiple tap positive rectified DC output and the multiple tap negative rectified DC output section cooperatively form a first and second electronic gear.

27. The variable output induction motor drive system of claim 26 wherein said sine wave power control includes logic to select taps on said transformer to effect an electronic gearbox and match the outputs of said power control generators to variations in motor impedance which occur in the polyphase variable output alternating current motor under different rotor speed and load conditions.

28. The variable output induction motor drive system of claim 1 wherein said sine wave power control includes a system feedback means having a voltage reference generator to generate a voltage reference to control operation of said variable output induction motor drive system.

29. The variable output induction motor drive system of claim 28 wherein said sine wave power control further includes a current reference generator to generate a current reference to control operation of said variable output induction motor drive system.

30. The variable output induction motor drive system of claim 1 wherein said sine wave power control includes a current reference generator to generate a current reference signal to control operation of said variable output induction motor drive system.

31. The variable output induction motor drive system of claim 30 wherein said sine wave power control further includes a voltage reference generator to generate a voltage reference to generate a power signal when the corresponding phase is operating in a reverse power region.

32. The variable output induction motor drive system of claim 1 wherein said power control stage further includes a reverse power control to provide a controlled load that can maintain said sine wave current in the motor windings of the polyphase variable output alternating current motor when the input voltage and current for the corresponding phase are of opposite polarity.

33. The variable output induction motor drive system of claim 32 wherein each said power control generator shut off by said sine wave power control when operating in the respective reverse power regions; and reverse power is fed from one phase of the polyphase variable output induction motor operating in the region of opposite polarity through said variable output induction motor drive system to the other two phases of the polyphase variable output induction motor.

34. The variable output induction motor drive system of claim 32 wherein corresponding frequency control generators, power control generators and reverse power control cooperatively comprise the corresponding phase sine wave current generator for each corresponding phase a, b, c of the polyphase variable output alternating current motor.

35. The variable output induction motor drive system of claim 32 including means to independently control the stator current and the rotor slip.

36. The variable output induction motor drive system of claim 32 wherein said sine wave power control comprises a system control including means to monitor and control the operation of the polyphase variable output alternating current motor, an operating parameter detector or monitor to determine rotor speed operatively coupled.between the polyphase variable output alternating current motor and the system control and a system operating control including a first torque control input device.

37. The variable output induction motor drive system of claim 1 wherein said sine wave power control including means to control the frequency of said sine wave.

38. The variable output induction motor drive system of claim 37 wherein said frequency of said sine wave current is set by said sine wave power control.

39. The variable output induction motor drive system of claim 38 further includes a tachometer to measure the rotor speed or frequency.

40. The variable output induction motor drive system of claim 39 wherein said tachometer comprises an electronic tachometer including means to calculate the output rotor speed or frequency.

41. The variable output induction motor drive system of claim 40 wherein said means to calculate comprises the stator voltage and lagging current waveforms may be divided into equal increments of time by an $f_s$ clock, said $f_s$ clock is locked in frequency to the motor excitation frequency $f_s$ such that $f_s$ clock is a predetermined value.

42. The variable output induction motor drive system of claim 41 wherein said electronic tachometer comprises a counter coupled to a storage register through a transfer gate, a first and second digital to analog convertor coupled to the storage register and a performance register, a comparator with an inverter coupled to output the first and second digital to analog converters, a first and second gate coupled between the comparator with the inverter and an up/down counter.

43. A variable output induction motor drive system for use with a polyphase variable output alternating current motor including a rotor and stator to drive an operating load, said variable output induction motor drive system comprises a sine wave current generator operatively coupled to a direct current power source to receive direct current therefrom including means to modulate direct current from the direct current power source with a sine wave signal to generate a variable sinusoidal current and operatively coupled to the polyphase variable output alternating current motor to selectively feed the variable sinusoidal current thereto and a sine wave power control coupled between said sine wave current generator and the polyphase variable output alternating current motor to monitor the operating parameters of the polyphase variable output alternating current motor and to control the amplitude and frequency of the variable frequency, variable amplitude sinusoidal current fed from said sine wave current generator to the polyphase variable output alternating current motor to control the output torque and speed thereof, said sine wave current generator comprises a frequency control stage, an amplitude control stage and a power control stage; said frequency control stage comprising a plurality of frequency control generators to generate a constant amplitude, variable frequency rectified control signal corresponding to each of phases of the polyphase variable output alternating current motor; said amplitude control stage coupled to said frequency control stage comprising a plurality of amplitude control generators to control the amplitude of the constant amplitude, variable frequency rectified signal from the corresponding frequency control generator to generate a variable frequency, variable amplitude control rectified signal and said power control stage comprises a plurality of-power control generators coupled to said amplitude control stage to modulate the DC input power from the DC power source with variable frequency and variable amplitude rectified signals from said corresponding amplitude control generators to generate a variable frequency, variable amplitude sine wave current fed to each corresponding phase of the polyphase variable output alternating current motor.

44. The variable output induction motor drive system of claim 43 wherein each said frequency control generator comprises a sine wave generator section to generate a variable frequency sine wave and a rectifier section to rectify said variable frequency sine wave to generate said variable frequency rectified signal fed to said corresponding amplitude control generator of said amplitude control stage.

45. The variable output induction motor drive system of claim 44 wherein each power control generator comprises a power modulator to modulate the DC input power from the DC power source with the variable frequency, variable amplitude rectified signal from the corresponding amplitude control generator.

46. The variable output induction motor drive system of claim 45 wherein each said power modulator comprises a pair of series resonant circuits.

47. The variable output induction motor drive system of claim 46 wherein each said series resonant circuit comprises a first and second resonant inverter stage operatively coupled to the DC power source thereof, a DC power input stage and the polyphase variable output alternating current motor through an AC power output stage.

48. A variable output induction motor drive system for use with a polyphase variable output alternating current motor including a rotor and stator to drive an operating load, said variable output induction motor drive system comprises a sine wave current generator including time phase controlled resonant circuits operatively coupled to a direct current power source to receive direct current therefrom to control the flow of direct current from the direct current power source to the operating load in a sinusoidal wave form and operatively coupled to the polyphase variable output alternating current motor to selectively feed the variable sine wave current thereto and a sine wave current control coupled between said sine wave current generator and the polyphase variable output alternating current motor to monitor the operating parameters of the polyphase variable output alternating current motor and to control the amplitude and frequency of the variable sine wave current fed from said sine wave current generator to the polyphase variable output alternating current motor to control the output torque and speed thereof.

49. The variable output induction motor drive system of claim 48 wherein said sine wave current generator comprises a frequency control stage, an amplitude control stage and a power control stage; said frequency control stage comprising a plurality of frequency control generators to generate a constant amplitude, variable frequency rectified control signal corresponding to each of phases of the polyphase variable output alternating current motor; said amplitude control stage coupled to said frequency control stage comprising a plurality of amplitude control generators to control the amplitude of the constant amplitude, variable frequency rectified signal from the corresponding frequency control generator to generate a variable frequency, variable amplitude control rectified signal and said power control stage comprises a plurality of power control generators coupled to said amplitude control stage to modulate the DC input power from the DC power source with variable frequency and variable amplitude rectified signals from said corresponding amplitude control generators to generate a variable frequency, variable amplitude sine wave current fed to each corresponding phase of the polyphase variable output alternating current motor.

50. The variable output induction motor drive system of claim 49 wherein each said frequency control generator comprises a sine wave generator section to generate a variable frequency sine wave and a rectifier section to rectify said variable frequency sine wave to generate said variable frequency rectified signal fed to said corresponding amplitude control generator of said amplitude control stage.

51. The variable output induction motor drive system of claim 50 wherein each power control generator comprises a power modulator to modulate the DC input power from the DC power source with the variable frequency, variable amplitude rectified signal from the corresponding amplitude control generator.

52. The variable output induction motor drive system of claim 51 wherein each said power modulator comprises a pair of series resonant circuits.

53. The variable output induction motor drive system of claim 52 wherein each said series resonant circuit comprises a first and second resonant inverter stage operatively coupled to the DC power source thereof, a DC power input stage and the polyphase variable output alternating current motor through an AC power output stage.

54. A variable output induction motor drive system for use with a polyphase variable output alternating current motor including a rotor and stator to drive an operating load, said variable output induction motor drive system comprises a sine wave power generator operatively coupled to a direct current power source to receive direct current therefrom and to generate a variable sine wave and operatively coupled to the polyphase variable output alternating current motor to selectively feed the variable sine wave thereto and a sine wave control coupled between said sine wave power generator and the polyphase variable output alternating current motor to monitor the operating parameters of the polyphase variable output alternating current motor and to control the amplitude and frequency of the variable sine wave fed from the sine wave power generator to the polyphase variable output alternating current motor to control the output torque and speed thereof, said sine wave power generator comprises a frequency control stage, an amplitude control stage and a power control stage; said frequency control stage comprising a plurality of frequency control generators to generate a constant amplitude, variable frequency rectified control signal corresponding to each of phases of the polyphase variable output alternating current motor; said amplitude control stage coupled to said frequency control stage comprising a plurality of amplitude control generators to control the amplitude of the constant amplitude, variable frequency rectified signal from the corresponding frequency control generator to generate a variable frequency, variable amplitude control rectified signal and said power control stage comprises a plurality of power control generators coupled to said amplitude control stage to modulate the DC input power from the DC power source with variable frequency and variable amplitude rectified signals from said corresponding amplitude control generators to generate a variable frequency, variable amplitude sine wave fed to each corresponding phase of the polyphase variable output alternating current motor.

55. The variable output induction motor drive system of claim 54 wherein each said frequency control generator comprises a sine wave generator section to generate a variable frequency sine wave and a rectifier section to rectify said variable frequency sine wave to generate said variable frequency rectified signal fed to said corresponding amplitude control generator of said amplitude control stage.

56. The variable output induction motor drive system of claim 55 wherein each power control generator comprises a power modulator to modulate the DC input power from the DC power source with the variable frequency, variable amplitude rectified signal from. the corresponding amplitude control generator.

57. The variable output induction motor drive system of claim 56 wherein each said power modulator comprises a pair of series resonant circuits.

58. The variable output induction motor drive system of claim 57 wherein each said series resonant circuit comprises a first and second resonant inverter stage operatively coupled to the DC power source thereof, a DC power input stage and the polyphase variable output alternating current motor through an AC power output stage.

59. A variable output induction motor drive system for use with a polyphase variable output alternating current motor including a rotor and stator to drive an operating load, said variable output induction motor drive system comprises a sine wave current generator operatively coupled to a direct current power source to receive direct current therefrom and to generate a variable frequency, variable amplitude sine wave current and operatively coupled to the polyphase variable output alternating current motor to selectively feed the variable frequency, variable amplitude sine wave current thereto and a sine wave power control coupled between said sine wave current generator and the polyphase variable output alternating current motor to monitor the operating parameters of the polyphase variable output alternating current motor and to control the amplitude and frequency of the variable frequency, variable amplitude sine wave current fed from said sine wave current generator to the polyphase variable output alternating current motor to control the output torque and speed thereof, said sine wave current generator comprises a frequency control stage, an amplitude control stage and a power control stage; said frequency control stage comprising a plurality of frequency control generators to generate a constant amplitude, variable frequency rectified signal corresponding to each of phases of the polyphase variable output alternating current motor; said amplitude control stage coupled to said frequency control stage comprising a plurality of amplitude control generators to control the amplitude of the constant amplitude, variable frequency rectified signal from the corresponding frequency control generator to generate a variable frequency, variable amplitude control rectified signal and said power control stage comprises a plurality of power control generators coupled to said amplitude control stage to modulate the DC input power from the DC power source with variable frequency and variable amplitude rectified signals from said corresponding amplitude control generators to generate the variable frequency, variable amplitude sine wave current fed to each corresponding phase of the polyphase variable output alternating current motor.

* * * * *